US012400211B2

(12) United States Patent
Suzuki

(10) Patent No.: US 12,400,211 B2
(45) Date of Patent: Aug. 26, 2025

(54) INFORMATION PROCESSING DEVICE, MOBILE TERMINAL, AND INFORMATION PROCESSING METHOD

(71) Applicant: Sony Group Corporation, Tokyo (JP)

(72) Inventor: Takashi Suzuki, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 402 days.

(21) Appl. No.: 18/019,178

(22) PCT Filed: Aug. 25, 2021

(86) PCT No.: PCT/JP2021/031072
§ 371 (c)(1),
(2) Date: Feb. 1, 2023

(87) PCT Pub. No.: WO2022/054574
PCT Pub. Date: Mar. 17, 2022

(65) Prior Publication Data
US 2023/0325807 A1  Oct. 12, 2023

(30) Foreign Application Priority Data
Sep. 8, 2020  (JP) .................................. 2020-150495

(51) Int. Cl.
*H04W 4/80* (2018.01)
*G01S 5/02* (2010.01)
(Continued)

(52) U.S. Cl.
CPC ........ *G06Q 20/3278* (2013.01); *G01S 5/0268* (2013.01); *G06Q 2240/00* (2013.01); *G07B 15/02* (2013.01); *H04W 4/80* (2018.02)

(58) Field of Classification Search
CPC ............ G06Q 20/3278; G06Q 2240/00; G01S 5/0268; H04W 4/80; G07B 15/02
(Continued)

(56) References Cited

U.S. PATENT DOCUMENTS

| 5,748,138 A | * | 5/1998 | Telle | ....................... G01S 17/74 |
| | | | | 342/6 |
| 10,798,547 B2 | * | 10/2020 | Gold | ...................... G06Q 30/02 |

(Continued)

FOREIGN PATENT DOCUMENTS

| JP | 2014-219836 A | 11/2014 |
| JP | 2018-532180 A | 11/2018 |
| WO | WO 2016/009738 A1 | 1/2016 |

*Primary Examiner* — April G Gonzales
(74) *Attorney, Agent, or Firm* — Paratus Law Group, PLLC

(57) ABSTRACT

There is provided an information processing device, a mobile terminal, and an information processing method capable of executing information processing more reliably. Bluetooth Low Energy (BLE) is used to transmit a beacon that is a signal for detecting a mobile terminal within a communication range of the BLE. Ultra Wide Band (UWB) is used to perform ranging processing of measuring at least a distance from the mobile terminal detected using the beacon to a UWB gate unit provided with a fare calculation zone in which fare payment processing is performed with the mobile terminal. Then, when it is detected that the mobile terminal enters the fare calculation zone on the basis of a result of the ranging processing using UWB, data communication for payment using UWB is performed between the UWB gate unit and the mobile terminal. The present technology can be applied to, for example, a touchless fare payment system using BLE and UWB.

16 Claims, 22 Drawing Sheets

(51) Int. Cl.
*G06Q 20/32* (2012.01)
*G07B 15/02* (2011.01)

(58) Field of Classification Search
USPC .......................................................... 455/39
See application file for complete search history.

(56) References Cited

U.S. PATENT DOCUMENTS

| | | | |
|---|---|---|---|
| 2004/0093265 A1* | 5/2004 | Ramchandani | G06Q 30/0261 705/14.66 |
| 2004/0093268 A1* | 5/2004 | Ramchandani | G06Q 30/02 705/14.13 |
| 2013/0080289 A1* | 3/2013 | Roy | G06Q 20/322 705/26.8 |
| 2013/0198019 A1* | 8/2013 | Smith | G06Q 20/3278 705/17 |
| 2016/0057565 A1* | 2/2016 | Gold | H04W 4/023 455/41.1 |
| 2016/0323717 A1* | 11/2016 | Friday | G01S 5/0278 |
| 2018/0182240 A1* | 6/2018 | Baranga | G08G 1/0112 |
| 2018/0335781 A1* | 11/2018 | Chase | G08G 1/0133 |
| 2019/0087807 A1* | 3/2019 | Choi | H04L 9/3226 |
| 2019/0313466 A1* | 10/2019 | Ko | H04W 72/51 |
| 2019/0325411 A1* | 10/2019 | Kai | G06Q 20/322 |
| 2019/0385116 A1* | 12/2019 | Vosshenrich | G07G 1/0081 |
| 2020/0082370 A1* | 3/2020 | Yang | G06Q 20/20 |
| 2020/0225892 A1* | 7/2020 | Nishino | G06F 3/1292 |

* cited by examiner

FIG. 19

EXCLUDED DEVICE ID LIST

| No. # | EXCLUDED REQUEST DEVICE ID | EXCLUDED DEVICE ID1 | EXCLUDED DEVICE ID2 |
|---|---|---|---|
| 1 | Device1 | Device2 | - |
| 2 | Device4 | Device5 | Device6 |
| 3 | empty | empty | |
| ... | ... | ... | |
| 58 | empty | empty | - |
| 59 | empty | empty | - |

FIG. 20
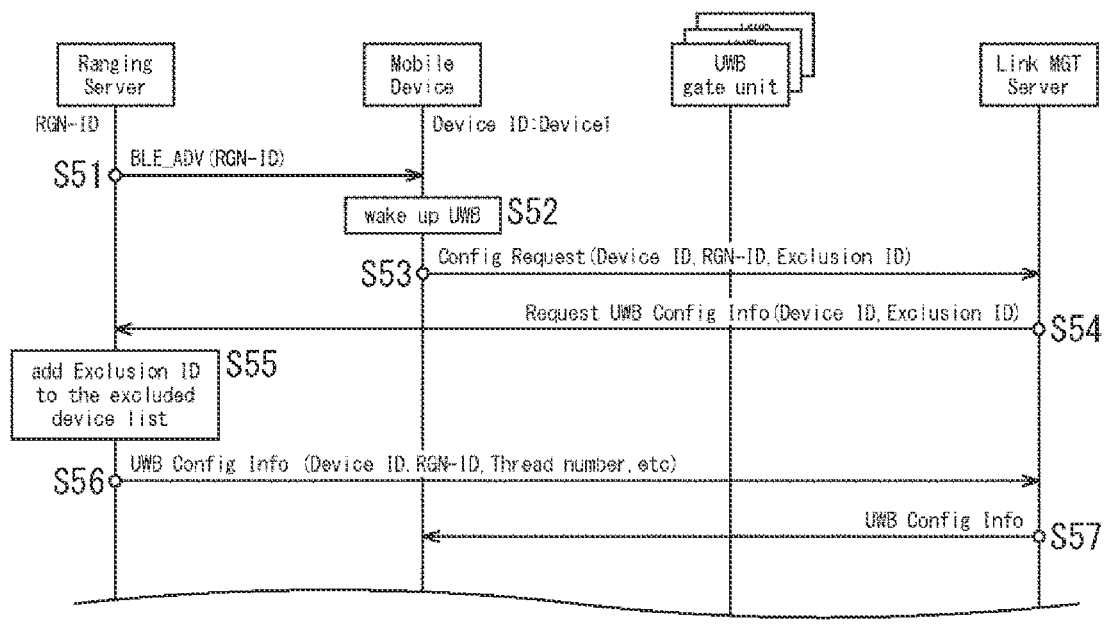
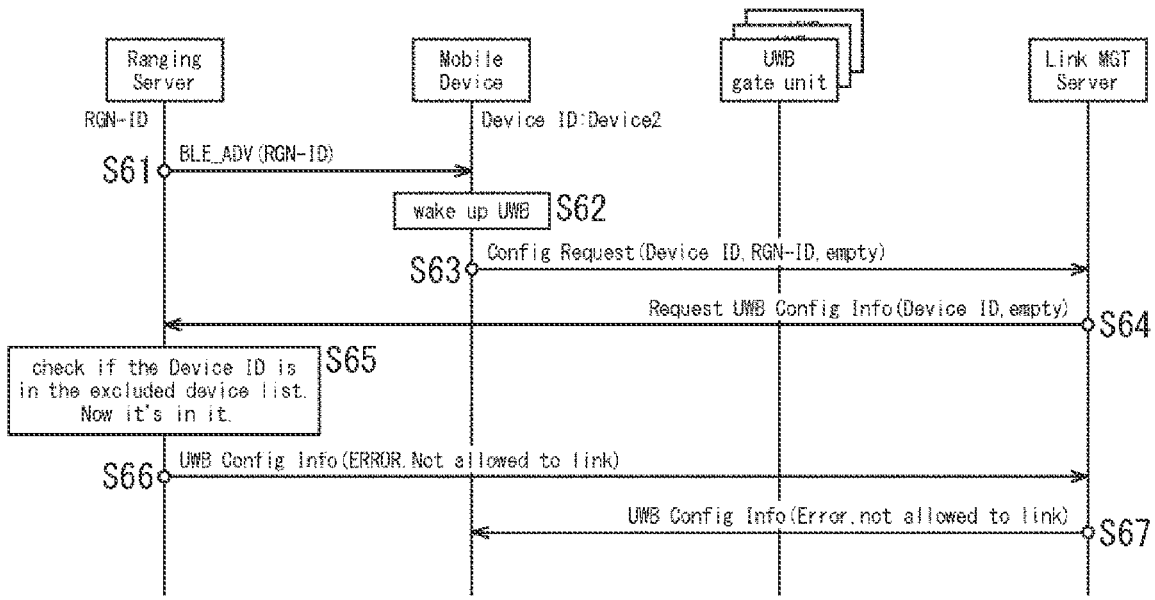

*FIG. 21*
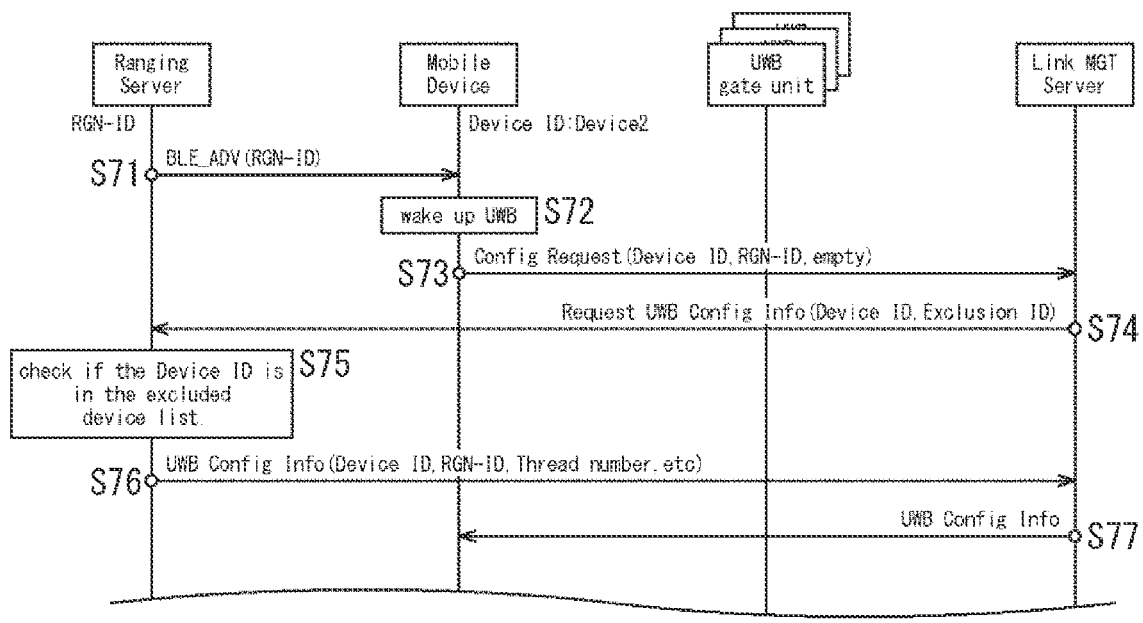
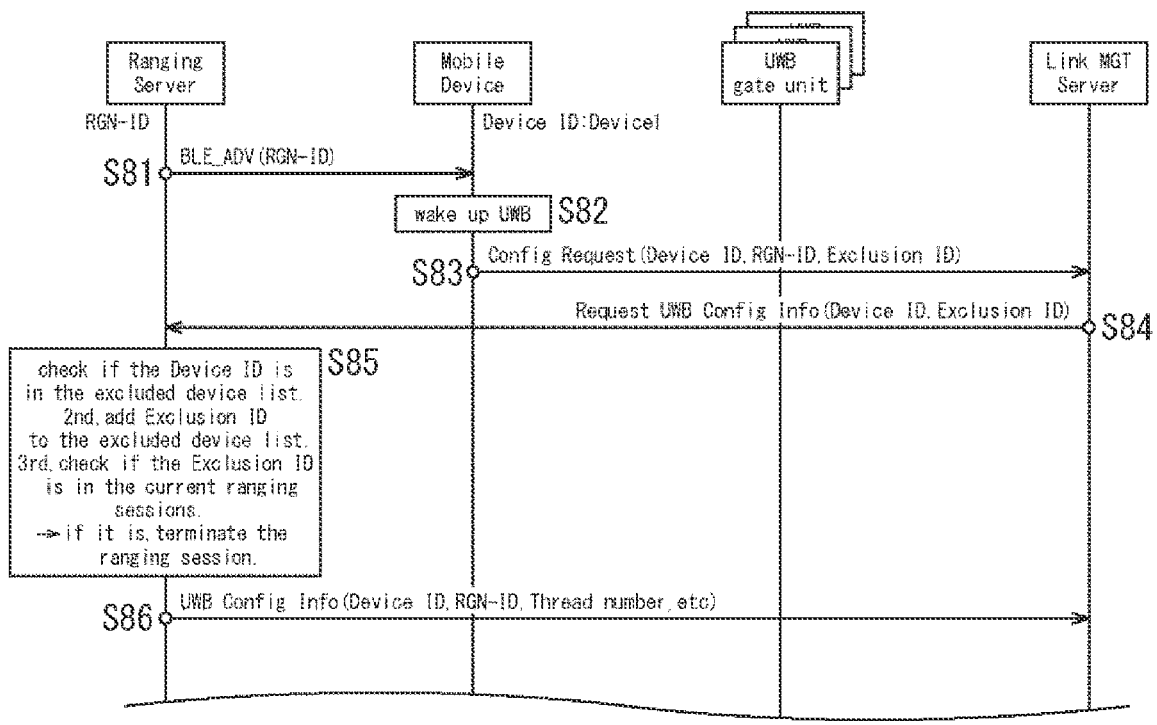

INFORMATION PROCESSING DEVICE, MOBILE TERMINAL, AND INFORMATION PROCESSING METHOD

CROSS REFERENCE TO PRIOR APPLICATION

This application is a National Stage Patent Application of PCT International Patent Application No. PCT/JP2021/031072 (filed on Aug. 25, 2021) under 35 U.S.C. § 371, which claims priority to Japanese Patent Application No. 2020-150495 (filed on Sep. 8, 2020), which are all hereby incorporated by reference in their entirety.

TECHNICAL FIELD

The present disclosure relates to an information processing device, a mobile terminal, and an information processing method, and more particularly relates to an information processing device, a mobile terminal, and an information processing method capable of executing information processing more reliably.

BACKGROUND ART

Conventionally, near field communication (NFC) that performs wireless communication at a short distance of about 10 cm has been used in a fare payment system for paying a fare at a ticket gate of a station. When the user performs an operation of touching a ticket gate machine with a mobile terminal including a non-contact integrated circuit (IC), information processing for paying a fare is executed.

On the other hand, in recent years, a technology for enabling a fare to be paid in a touchless manner by using Ultra Wide Band (UWB), Bluetooth Low Energy (BLE) (registered trademark), or the like that performs wireless communication in a wider range in a fare payment system has been developed.

For example, Patent Document 1 discloses an information processing system that performs authentication by communication in a first communication distance and performs processing such as a ticket gate by communication in a second communication distance shorter than the first communication distance.

CITATION LIST

Patent Document

Patent Document 1: WO 2016/009738

SUMMARY OF THE INVENTION

Problems to be Solved by the Invention

Incidentally, in a fare payment system using UWB, BLE, or the like, it is assumed that a plurality of ticket gates is installed at a station, and a large number of users pass through the ticket gates. At this time, it is necessary to provide technologies such as ensuring simultaneous connection of a large number of mobile terminals, specifying which ticket gate a user passes through, avoiding interference between electromagnetic waves for ranging and electromagnetic waves for data communication, and quickly processing communication with a secure element of a mobile terminal. Thus, it is required to achieve a fare payment system capable of accurately connecting a mobile terminal and a ticket gate and reliably executing information processing for paying a fare.

The present disclosure has been made in view of such a situation, and enables information processing to be executed more reliably.

Solutions to Problems

An information processing device according to a first aspect of the present disclosure includes a beacon transmission unit that transmits, by using first wireless communication that is a communication standard capable of performing communication in a wider range than a predetermined short distance, a beacon that is a signal for detecting a mobile terminal within a communication range of the first wireless communication, and a ranging processing unit that performs, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, in which when it is detected that the mobile terminal enters the payment area on the basis of a result of ranging processing using the second wireless communication, data communication for payment using the second wireless communication is performed between the payment unit and the mobile terminal.

An information processing method according to the first aspect of the present disclosure includes, by an information processing device, transmitting, by using first wireless communication that is a communication standard capable of performing communication in a wider range than a predetermined short distance, a beacon that is a signal for detecting a mobile terminal within a communication range of the first wireless communication, and performing, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, in which when it is detected that the mobile terminal enters the payment area on the basis of a result of ranging processing using the second wireless communication, data communication for payment using the second wireless communication is performed between the payment unit and the mobile terminal.

In the first aspect of the present disclosure, by using first wireless communication that is a communication standard capable of performing communication in a wider range than a predetermined short distance, a beacon that is a signal for detecting a mobile terminal within a communication range of the first wireless communication is transmitted, and by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which payment is performed with the mobile terminal is performed. Then, when it is detected that the mobile terminal enters the payment area on the basis of a result of ranging processing using the second wireless communication, data communication for payment using the second wireless communication is performed between the payment unit and the mobile terminal.

A mobile terminal according to a second aspect of the present disclosure receives, by using first wireless communication that is a communication standard capable of performing communication in a wider range than a predetermined short distance, a beacon that is a signal transmitted from an information processing device and is for detecting a mobile terminal within a communication range of the first wireless communication, and performs, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, in which in response to detection of entering the payment area on the basis of a result of ranging processing using the second wireless communication, data communication for payment using the second wireless communication is performed with the payment unit.

An information processing method according to the second aspect of the present disclosure includes, by a mobile terminal, receiving, by using first wireless communication that is a communication standard capable of performing communication in a wider range than a predetermined short distance, a beacon that is a signal transmitted from an information processing device and is for detecting a mobile terminal within a communication range of the first wireless communication, and performing, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, in which in response to detection of entering the payment area on the basis of a result of ranging processing using the second wireless communication, data communication for payment using the second wireless communication is performed with the payment unit.

In the second aspect of the present disclosure, by using first wireless communication that is a communication standard capable of performing communication in a wider range than a predetermined short distance, a beacon that is a signal transmitted from an information processing device and is for detecting a mobile terminal within a communication range of the first wireless communication is received, and by using second wireless communication that is a communication standard different from the first wireless communication and is capable of performing communication in a wider range than the predetermined short distance, ranging processing of measuring at least a distance to a payment unit provided with a payment area in which predetermined payment processing is performed is performed, in which in response to detection of entering the payment area on the basis of a result of ranging processing using the second wireless communication, data communication for payment using the second wireless communication is performed with the payment unit.

BRIEF DESCRIPTION OF DRAWINGS

FIG. 19 is a diagram illustrating an example of an excluded device ID list.

FIG. 20 is a flowchart describing processing in a case where the touchless fare payment processing is started first for a priority mobile terminal.

FIG. 21 is a flowchart describing processing in a case where the touchless fare payment processing is started first for a non-priority mobile terminal.

MODE FOR CARRYING OUT THE INVENTION

Hereinafter, specific embodiments to which the present technology is applied will be described in detail with reference to the drawings.

Configuration Example of Payment System

Figure 1:
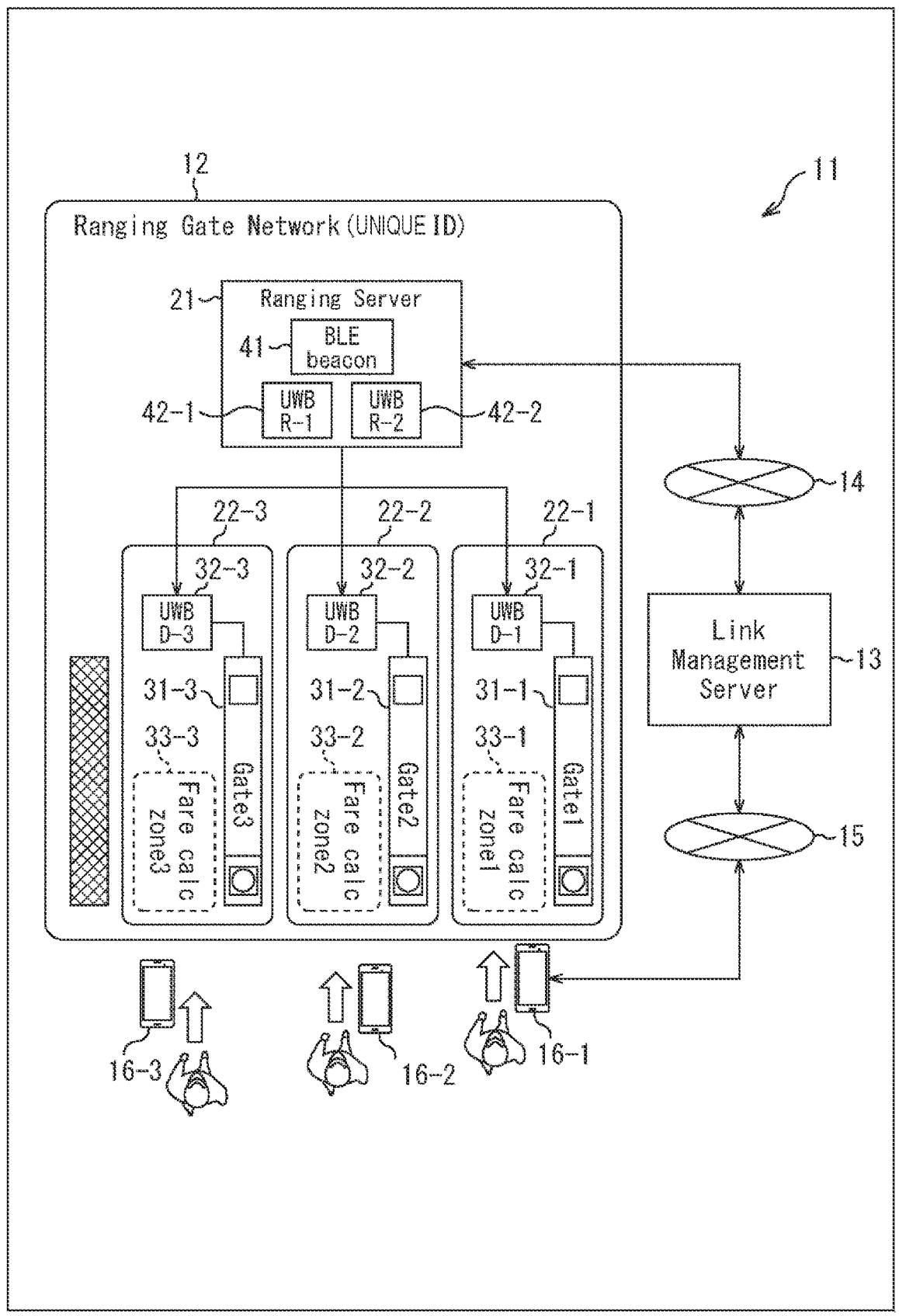
FIG. 1 is a block diagram illustrating a configuration example of an embodiment of a touchless fare payment system to which the present technology is applied.

FIG. 1 is a block diagram illustrating a configuration example of an embodiment of a touchless fare payment system to which the present technology is applied.

For example, when a user passes through a ticket gate at a station where a plurality of ticket gate machines is installed, a touchless fare payment system 11 allows paying a fare without touching a ticket gate machine with a mobile terminal. In the touchless fare payment system 11, BLE (first wireless communication) and UWB (second wireless communication) are used, which are capable of performing wireless communication in a wider range than NEC that performs wireless communication only in a short distance using a 13.56 MHz band. BLE is wireless communication using a 2.4 GHz band, and is a communication standard capable of performing communication at a distance of about several centimeters to several tens of meters. UWB is wireless communication using a band of 500 MHz or more, and is a communication standard capable of performing communication over a distance of about 10 m.

As illustrated in FIG. 1, the touchless fare payment system 11 is configured by connecting a ranging gate network 12 and a link management server 13 via a network 14. Furthermore, the link management server 13 can be connected to a mobile terminal 16 possessed by the user passing through the ticket gate via the network 15. In the example illustrated in FIG. 1, three mobile terminals 16-1 to 16-3 are illustrated, but the touchless fare payment system 11 can pay a fare with a larger number of mobile terminals 16-1 in a touchless manner.

The ranging gate network 12 includes a ranging server 21 and a plurality of UWB gate units 22, and includes three UWB gate units 22-1 to 22-3 in the example illustrated in FIG. 1. In the touchless fare payment system 11, an RGN-ID is allocated to each ranging gate network 12 as a unique identification (ID).

Figure 2:
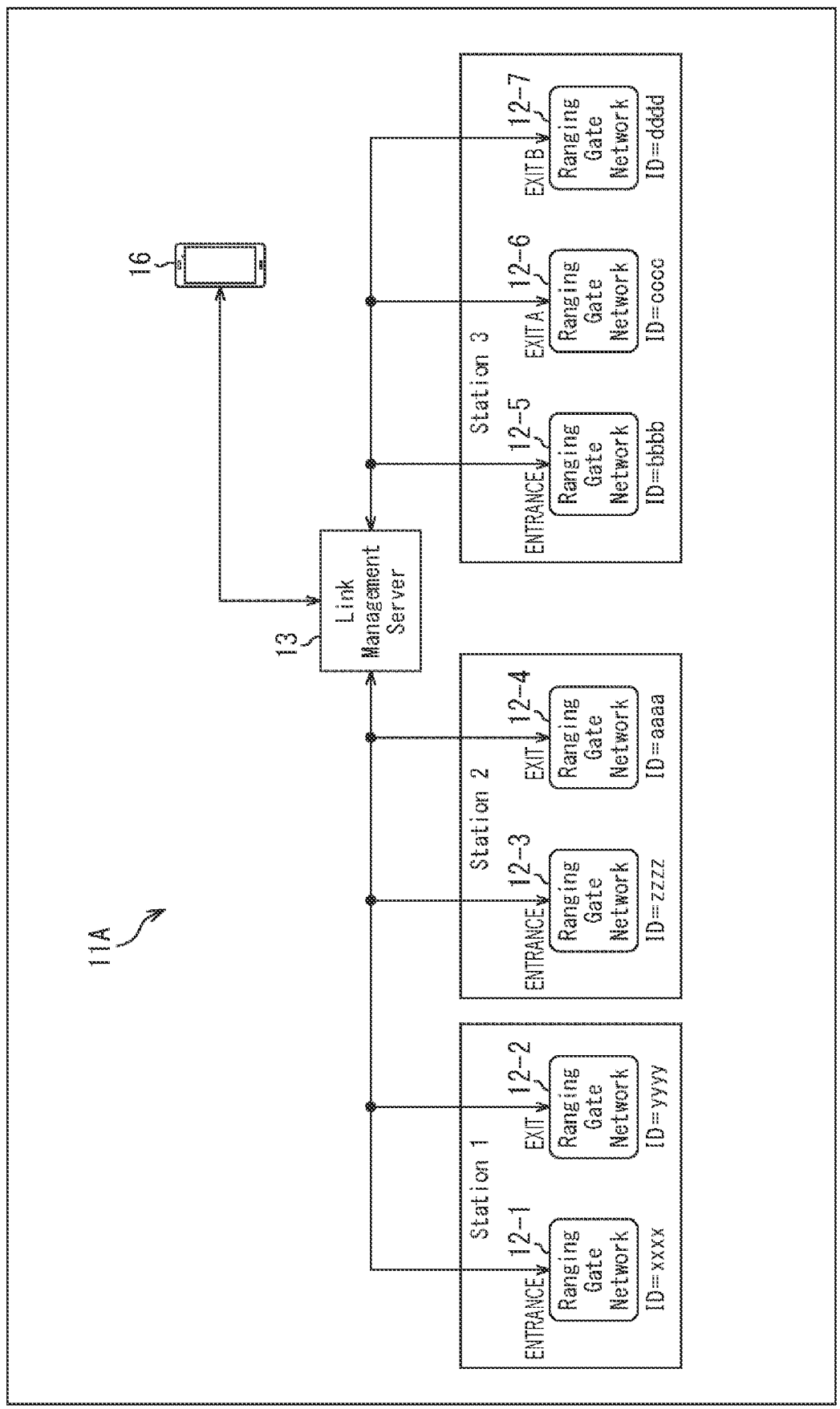
FIG. 2 is a block diagram illustrating a configuration example of a touchless fare payment system configured by a wide-area server.
Figure 3:
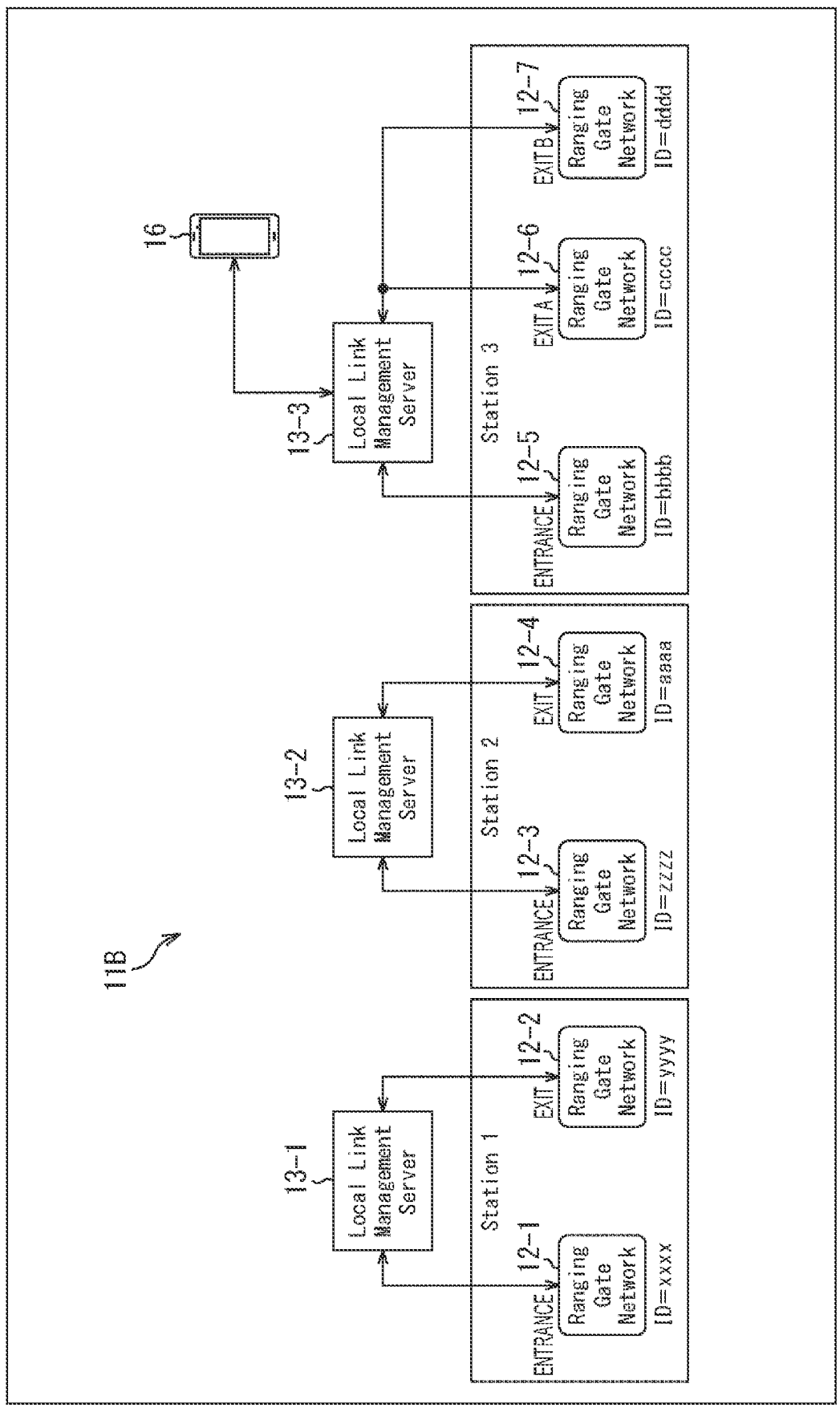
FIG. 3 is a block diagram illustrating a configuration example of a touchless fare payment system configured by a station server.

The link management server 13 manages connection of each mobile terminal 16 to the plurality of UWB gate units 22, and performs communication for exchanging various types of information necessary for ranging processing performed between the ranging server 21 and the mobile terminal 16 via the link management server 13. For example, the link management server 13 specifies the ranging gate network 12 of the ticket gate through which the user carrying the mobile terminal 16 tries to pass on the basis of the RGN-ID notification of which is provided from the mobile terminal 16. Then, the link management server 13 communicates with the ranging server 21 of the specified ranging gate network 12 to acquire ranging setting information, and notifies the mobile terminal 16 of the ranging setting information. Note that the link management server 13 may be a wide area server as illustrated in FIG. 2 or a station server as illustrated in FIG. 3.

The mobile terminal 16 supports the function of UWB, and operates as an initiator in UWB ranging processing in which distance measurement and positioning are performed with the ranging server 21 using UWB. Furthermore, the mobile terminal 16 has a configuration in which it is possible to directly access an embedded secure element (eSE) conventionally used in touch payment using NEC by a non-contact IC by the function of UWB.

The ranging server 21 executes the UWB ranging processing for measuring a distance and positioning of the mobile terminal 16 using UWB. The ranging server 21 incorporates a BLE beacon transmission device 41 and a plurality of UWB responder devices 42, and incorporates two UWB responder devices 42-1 and 42-2 in the example illustrated in FIG. 1.

For example, when performing the UWB ranging processing with the mobile terminal 16, the ranging server 21 can perform positioning by angle of arrival (AoA) simultaneously with distance measurement by time of flight (ToF). In the UWB ranging processing, at least a distance from the mobile terminal 16 to the UWB gate unit 22 is measured. The ranging server 21 has a connection function of connecting to a network, and exchanges device information, ranging setting information, and the like of the mobile terminal 16 with the link management server 13. Then, the ranging server 21 performs the UWB ranging processing to specify which UWB gate unit 22 the individual mobile terminal 16 passes through the ticket gate, and notifies the specified UWB gate unit 22 of this.

The BLE beacon transmission device 41 transmits a BLE beacon, which is a signal for detecting mobile terminals 16 that are within the communication range of BLE from the ranging gate network 12, in compliance with the standard of BLE.

The UWB responder devices 42-1 and 42-2 operate as responders in the UWB ranging processing in which distance measurement and positioning are performed with the mobile terminal 16 in accordance with the UWB standard. Note that the UWB responder devices 42-1 and 42-2 are similarly configured, and are simply referred to as UWB responder devices 42 in a case where there is no need to distinguish between them. The UWB responder devices 42 can use Ch-(R) for UWB communication channels for example, and uses Ch-9 as a specific example. The UWB responder device 42 is configured to prevent the radio wave output from the UWB responder device 42 from being transmitted to the inside of the ticket gate by providing directivity to the antenna or using a radio wave absorber.

The UWB gate unit 22 is arranged within a ranging range (within a communication range of UWB) in which the UWB ranging processing by the ranging server 21 is performed, and performs communication for paying a fare with the mobile terminal 16 possessed by a user passing through a ticket gate. The UWB gate units 22-1 to 22-3 are similarly configured and will be simply referred to as the UWB gate unit 22 in a case where there is no need to distinguish between them. The UWB gate unit 22 includes a ticket gate machine 31 and a UWB data communication unit 32, and a fare calculation zone 33 is provided in an area where a user passes through the ticket gate.

The ticket gate machine 31 includes an NFC reader/writer similarly to a conventional ticket gate machine in which touch payment using NBC by the non-contact IC is performed, and basically, a function as UWB is externally attached as an extension unit. Therefore, the ticket gate machine 31 can have a configuration in which a touchless payment function achieved by the touchless fare payment system 11 and a touch payment function using NEC by the non-contact IC are combined.

The UWB data communication unit 32 can perform data communication conforming to the UWB standard, and performs data communication processing for touchless payment with the mobile terminal 16. The UWB data communication units 32 are integrated one by one with respect to one ticket gate machine 31, and Ch-(D) is used for the UWB communication channel, and as a specific example, Ch-8 can be used.

The fare calculation zone 33 is provided in a passage on a side of the ticket gate machine 31. In the touchless fare payment system 11, when the user enters the fare calculation zone 33 when passing through the ticket gate, the data communication processing for touchless payment is executed with the mobile terminal 16.

As described above, in the touchless fare payment system 11, when the mobile terminal 16 is detected using the BLE beacon, the mobile terminal 16 acts as an initiator and the ranging server 21 acts as a responder, and the UWB ranging processing is performed. Then, when it is detected that the mobile terminal 16 has entered the fare calculation zone 33, the data communication processing for touchless payment is performed between the UWB gate unit 22 and the mobile terminal 16. Note that, in the UWB ranging processing, both the initiator and the responder can perform distance measurement with each other, and the processing can be performed with the ranging server 21 serving as the initiator and the mobile terminal 16 serving as the responder.

A variation of the touchless fare payment system 11 to which a plurality of ranging gate networks 12 is connected will be described with reference to FIGS. 2 and 3.

FIG. 2 illustrates a configuration example of a touchless fare payment system 11A in which the ranging gate networks 12 arranged at entrances and exits of a plurality of stations are connected to one link management server 13 (wide area server).

At the first station, a ranging gate network 12-1 (RGN-ID:xxxx) is disposed at an entrance, and a ranging gate network 12-2 (RGN-ID:yyyy) is disposed at an exit. At the second station, a ranging gate network 12-3 (RGN-ID:zzzz) is disposed at an entrance, and a ranging gate network 12-4 (RGN-ID:aaaa) is disposed at an exit. At the third station, a ranging gate network 12-5 (RGN-ID:bbbb) is disposed at an entrance, a ranging gate network 12-6 (RGN-ID:cccc) is disposed at an exit A, and a ranging gate network 12-7 (RGN-ID:dddd) is disposed at an exit B.

The touchless fare payment system 11A has a configuration in which ranging gate networks 12-1 to 12-7 are connected to one link management server 13. Then, the mobile terminal 16 possessed by the user passing through any one of the ticket gates of the ranging gate networks 12-1 to 12-7 communicates with the one link management server 13.

FIG. 3 illustrates a configuration example of a touchless fare payment system 11I in which the ranging gate networks 12 arranged at entrances and exits of a plurality of stations are connected to the link management server 13 (station server) provided for each station. In the first to third stations illustrated in FIG. 3, as in the configuration example illustrated in FIG. 2, ranging gate networks 12-1 to 12-7 are arranged.

In the touchless fare payment system 11B, the ranging gate networks 12-1 and 12-2 are connected to a link management server 13-1, the ranging gate networks 12-3 and 12-4 are connected to a link management server 13-2, and the ranging gate networks 12-5 to 12-7 are connected to a link management server 13-3.

Then, as illustrated, the mobile terminal 16 possessed by the user passing through any one of the ticket gates of the ranging gate networks 12-5 to 12-7 communicates with the link management server 13-3. Similarly, the mobile terminal 16 possessed by the user passing through the ticket gate of the ranging gate network 12-1 or 12-2 communicates with the link management server 13-1, and the mobile terminal 16 possessed by the user passing through the ticket gate of the ranging gate network 12-3 or 12-4 communicates with the link management server 13-2.

Processing Example of Touchless Fare Payment Processing

Touchless fare payment processing executed in the touchless fare payment system 11 will be described with reference to a flowchart illustrated in FIG. 4.

In step S11, the ranging server 21 continues to transmit the BLE beacon including the RGN-ID of the ranging gate network 12 via the BLE beacon transmission device 41 at prescribed intervals. Then, when the mobile terminal 16 within the receivable range of the BLE beacon transmitted from the BLE beacon transmission device 41 receives the BLE beacon, the processing proceeds to step S12.

In step S12, the mobile terminal 16 recognizes the BLE beacon received in step S11 and activates a built-in UWB chip.

In step S13, the mobile terminal 16 transmits a link connection request including its own device ID and the RGN-ID of the ranging gate network 12 to the link management server 13 via the network 15. Then, when the link management server 13 receives the link connection request, the processing proceeds to step S14.

In step S14, the link management server 13 specifies the ranging gate network 12 according to the RGN-ID included in the link connection request received in step S13. The link management server 13 transmits a setting information request for requesting transmission of ranging setting information necessary for setting the UWB ranging processing to the ranging server 21 included in the specified ranging gate network 12. The setting information request includes the device ID of the mobile terminal 16. Then, when the ranging server 21 receives the setting information request, the processing proceeds to step S15.

In step S15, the ranging server 21 transmits the ranging setting information including the device ID of the mobile terminal 16, the RGN-ID of the ranging gate network 12, and the like to the link management server 13. Furthermore, the ranging setting information also includes ranging distribution information, a session ID, a thread number, and the like. Then, when the link management server 13 receives the ranging setting information, the processing proceeds to step S16.

In step S16, the link management server 13 transmits the ranging setting information transmitted from the ranging server 21 in step S15 to the mobile terminal 16 that has transmitted the link connection request in step S13.

In step S17, the ranging server 21 transmits a synchronization signal for establishing synchronization in the UWB ranging processing to the mobile terminal 16 via the UWB responder device 42-1 or 42-2. Then, when the mobile terminal 16 receives the ranging setting information and the synchronization signal, the processing proceeds to step S18.

In step S18, the UWB ranging processing for measuring the distance and positioning of the mobile terminal 16 using UWB is executed between the ranging server 21 and the mobile terminal 16. Then, as a result of the UWB ranging processing, when the UWB gate unit 22 that is the ticket gate which the user carrying the mobile terminal 16 passes through is specified, the processing proceeds to step S19.

In step S19, the ranging server 21 waits for the mobile terminal 16 to enter the fare calculation zone 33 provided in the UWB gate unit 22 specified in step S18. Then, when the ranging server 21 detects that the mobile terminal 16 enters the fare calculation zone 33, the processing proceeds to step S20.

In step S20, the ranging server 21 transmits, to the mobile terminal 16, a data communication start signal instructing to start the data communication processing for touchless payment.

In step S21, the mobile terminal 16 changes the channel of UWB from the channel (R) for ranging to the channel (D) for data communication according to the data communication start signal.

In step S22, the ranging server 21 transmits a data communication start command including the device information (Device ID and Session ID) of the mobile terminal 16 to the UWB gate unit 22. Then, when the UWB gate unit 22 receives the data communication start command, the processing proceeds to step S23.

In step S23, the data communication processing for touchless payment (see FIG. 14 described later) is performed between the UWB gate unit 22 and the mobile terminal 16 similarly to data communication for payment by NFC using a predetermined non-contact IC (for example, FeliCa (registered trademark) or the like). Note that since a large amount of radio waves for ranging continues to be output even while the data communication processing for touchless payment is performed, data communication is performed on another channel that does not interfere with the radio waves. Then, when the data communication processing for touchless payment is completed, the processing proceeds to step S24.

In step S24, the UWB gate unit 22 transmits a data communication end notification including the device ID and the session ID to the ranging server 21.

In step S25, the ranging server 21 releases the device ID of the mobile terminal 16 from a ranging block thread (see FIG. 12 to be described later) according to the data communication end notification.

Figure 5:
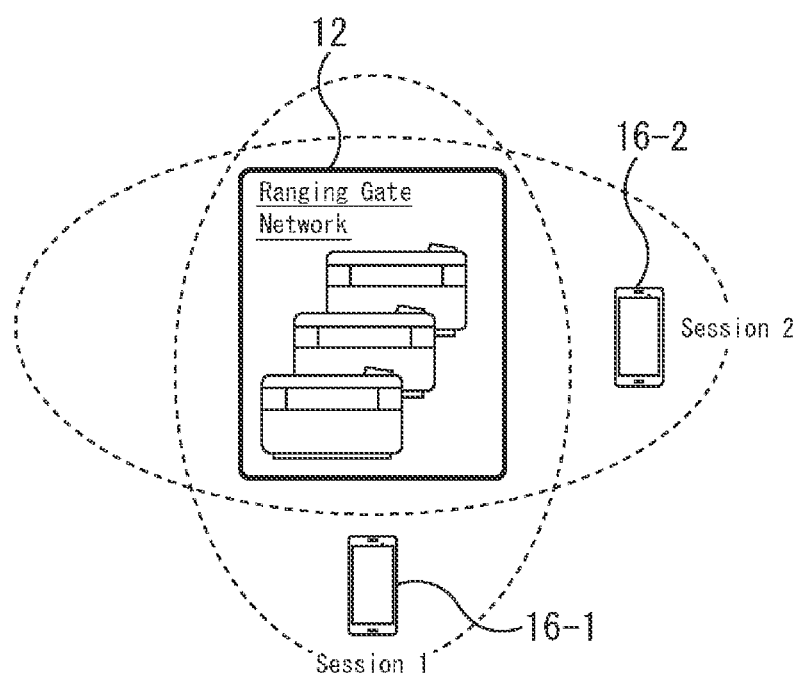
FIG. 5 is a diagram describing a unit of a ranging session.

Here, a unit of a ranging session used in the UWB ranging processing performed between the ranging server 21 and the mobile terminal 16 in the touchless fare payment system 11 will be described with reference to FIG. 5.

In the touchless fare payment system 11, independent sessions are simultaneously performed between one ranging gate network 12 and a plurality of mobile terminals 16 in a communication range. In the example illustrated in FIG. 5, the ranging gate network 12 executes a session 1 with a mobile terminal 16-1 and a session 2 with a mobile terminal 16-2. Accordingly, in the touchless fare payment system 11, a synchronization system that does not interfere in the time domain is employed.

Figure 6:
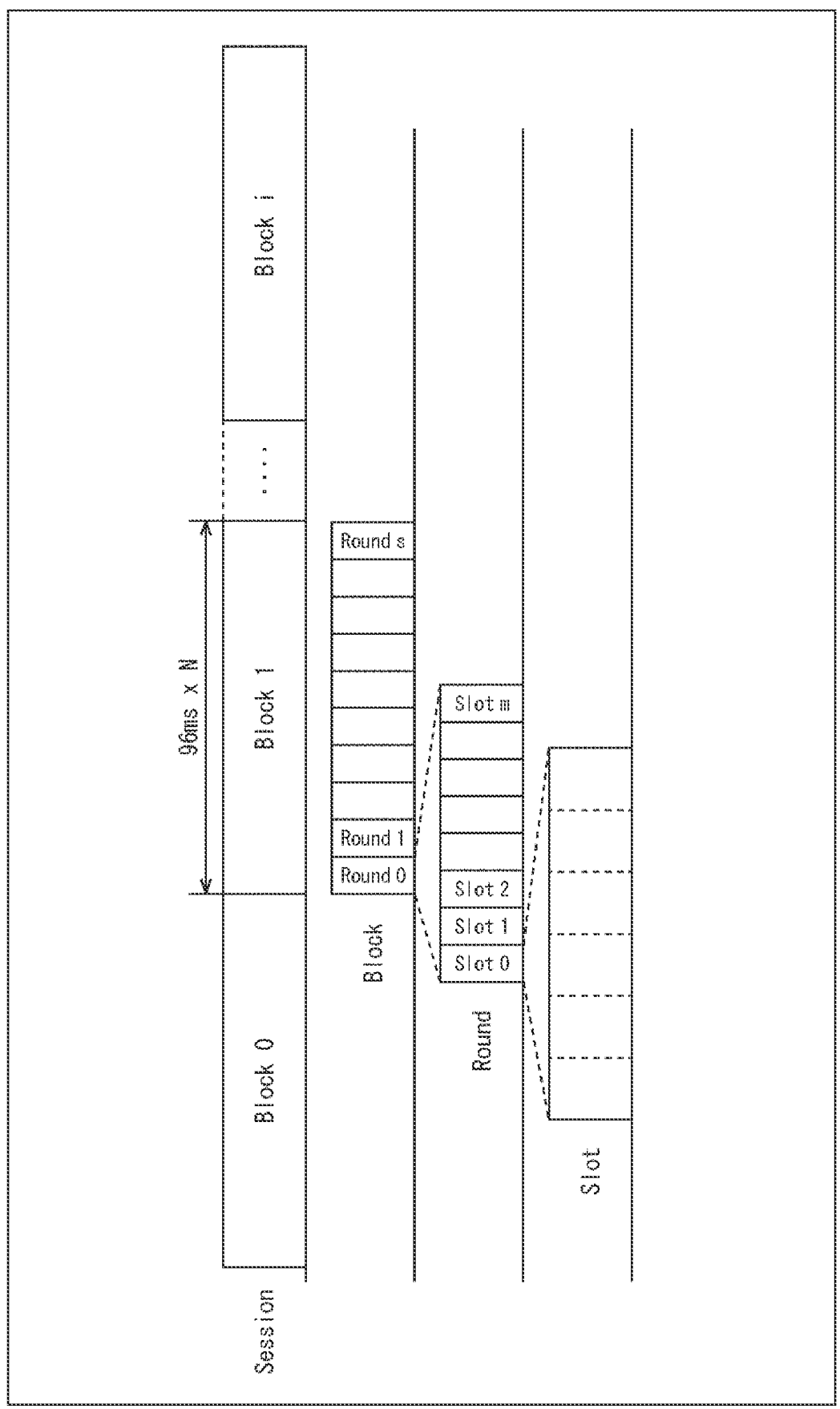
FIG. 6 is a diagram illustrating an example of a block based mode of UWB.

FIG. 6 illustrates a configuration example of a block based mode defined by IEEEE802.15.4z, and the ranging gate network 12 uses this block based mode.

As illustrated in FIG. 6, a session is configured by a series of a plurality of blocks, and one block is set to, for example, 96 ms×N time. The block includes s rounds, and the round includes m slots.

Time distribution of the ranging block thread set when the ranging server 21 executes the UWB ranging processing will be described with reference to FIG. 7.

Figure 7:
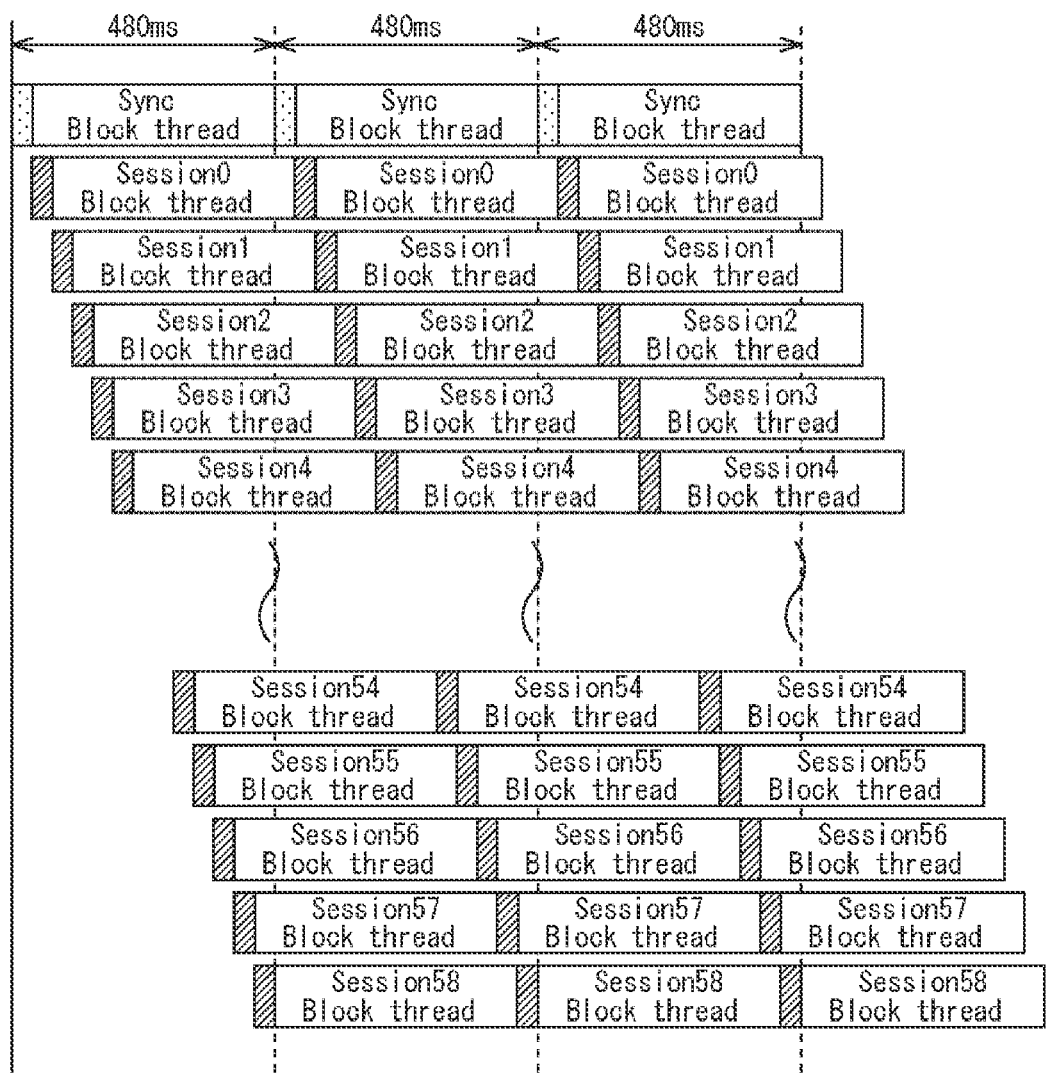
FIG. 7 is a diagram describing time distribution of a ranging block thread.

FIG. 7 illustrates an example of the ranging block thread under the condition that the ranging setting is such that 1 block is 480 ms and the ranging frequency is about 2 Hz. Furthermore, under this condition, in a case where the number of slots per round is eight and the time per slot is 1 ms, the number of rounds per block is 60.

As illustrated, the ranging server 21 performs serial processing in the time domain, and forms a time grid for multi-ranging by shifting the blocks by 1 round time. That is, transmission for each session of a block thread in which a plurality of blocks is continuous is repeatedly performed by time distribution in which the time of one round among a plurality of rounds constituting each block is shifted. Consequently, while the blocks are overlapped, since the sessions are synchronized, the head round can be used in a fixed manner without interference or hopping. Then, when supplementing the mobile terminal 16, the ranging server 21 allocates the mobile terminal 16 to any thread and executes the UNB ranging processing.

For example, by providing 59 sessions, the ranging server 21 can simultaneously process the UWB ranging processing with 59 mobile terminals 16. Of course, by changing setting parameters of the number of slots and the block time, the number of mobile terminals 16 that can be simultaneously processed by the ranging server 21 increases or decreases.

Note that the thread of session 0 may not be used for ranging as guard time after Sync detection.

Figure 8:
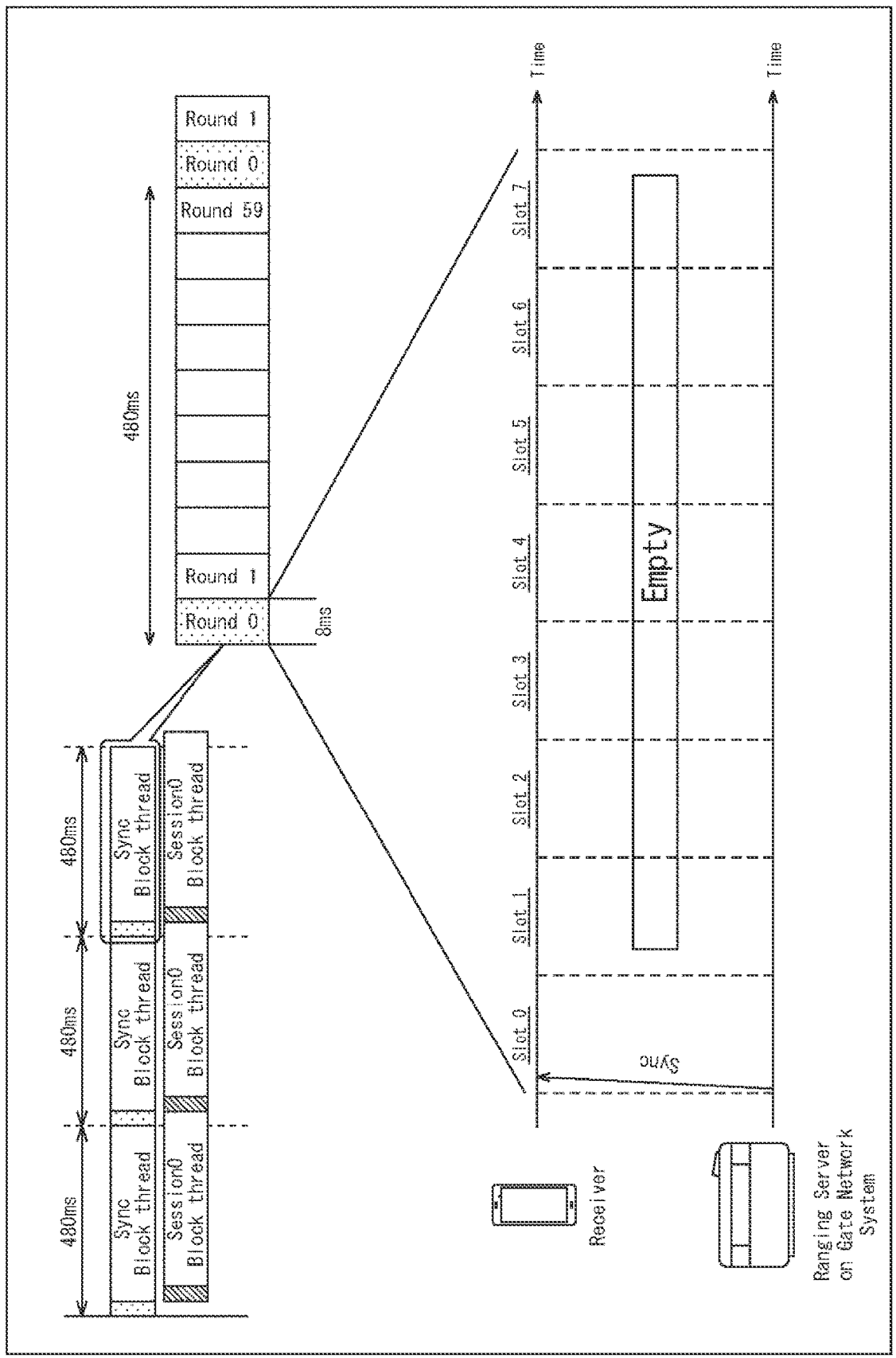
FIG. 8 is a diagram describing a synchronization signal.

A synchronization signal for synchronizing when the ranging server 21 executes the UNB ranging processing will be described with reference to FIG. 8.

The UWB responder device 42 specially transmits the synchronization signal in round 0 of a block thread for synchronization. The block thread for synchronization is transmitted at the first timing separately from the block thread for each session among the plurality of repeatedly transmitted block threads. As illustrated in the round of the block thread for synchronization, the synchronization signal (Sync) is included in the head slot (Slot 0), and the subsequent slots (Slots 1 to 7) are empty.

When the ranging session is started for the first time, the mobile terminal 16 transitions to a standby state of waiting for the synchronization signal, and can receive the synchronization signal. Thereafter, the mobile terminal 16 operates as the initiator.

Figure 9:
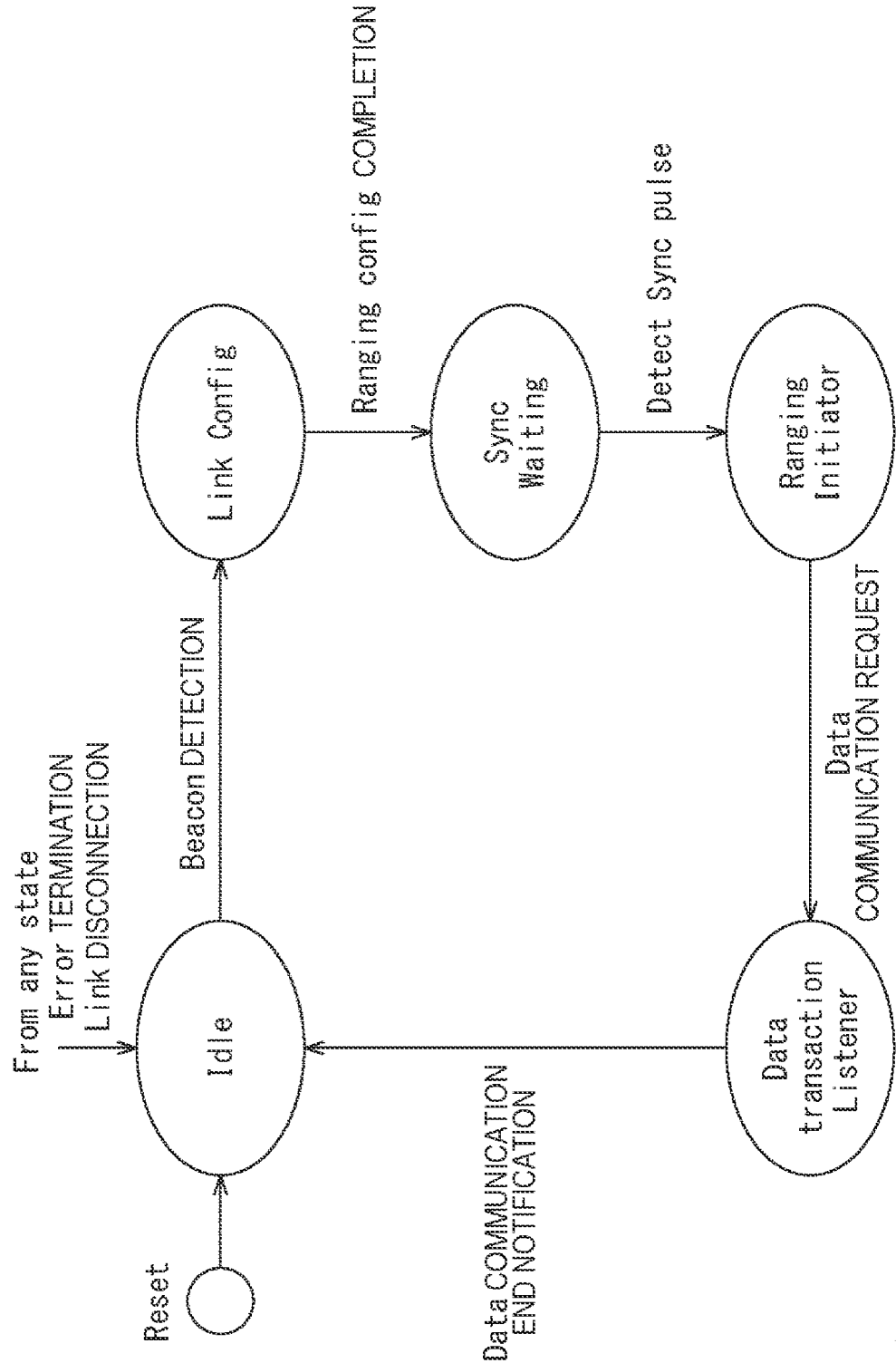
FIG. 9 is a diagram illustrating a state machine of a mobile terminal.

FIG. 9 illustrates a state machine of the mobile terminal 16.

For example, when the mobile terminal 16 is reset, it enters an idle state. Furthermore, from any state, when error termination, link disconnection, or the like occurs, the state becomes an idle state.

Upon detecting the beacon transmitted from the BLE beacon transmission device 41, the mobile terminal 16 activates the UWB chip and transitions from the idle state to a link setup state. Then, the mobile terminal 16 accesses the link management server 13 and requests acquisition of the ranging setting information necessary for setting the UWB ranging processing with the ranging server 21.

When the acquisition of the ranging setting information is completed, the mobile terminal 16 transitions from the link setting state to a synchronization standby state in order to wait for detection of the synchronization signal described above with reference to FIG. 8. In the synchronization standby state, the mobile terminal 16 may reduce the accumulated error by performing a detection operation of detecting the synchronization signal every time one block is processed.

Upon detecting the synchronization signal, the mobile terminal 16 transitions from the synchronization standby state to a ranging initiator state in order to perform distance measurement and positioning by operating as an initiator of ranging. Then, the mobile terminal 16 performs the UWB ranging processing with the ranging server 21.

As a result of performing the UWB ranging processing, when it is specified that the mobile terminal 16 enters the predetermined fare calculation zone 33, and data communication is requested from the UWB gate unit 22 in which the fare calculation zone 33 is set, the mobile terminal 16 transitions from the ranging initiator state to a data transaction listener state.

The mobile terminal 16 performs the data communication processing for touchless payment with the UWB gate unit 22, and transitions from the data transaction listener state to the idle state upon notification of the end of the data communication.

Figure 10:
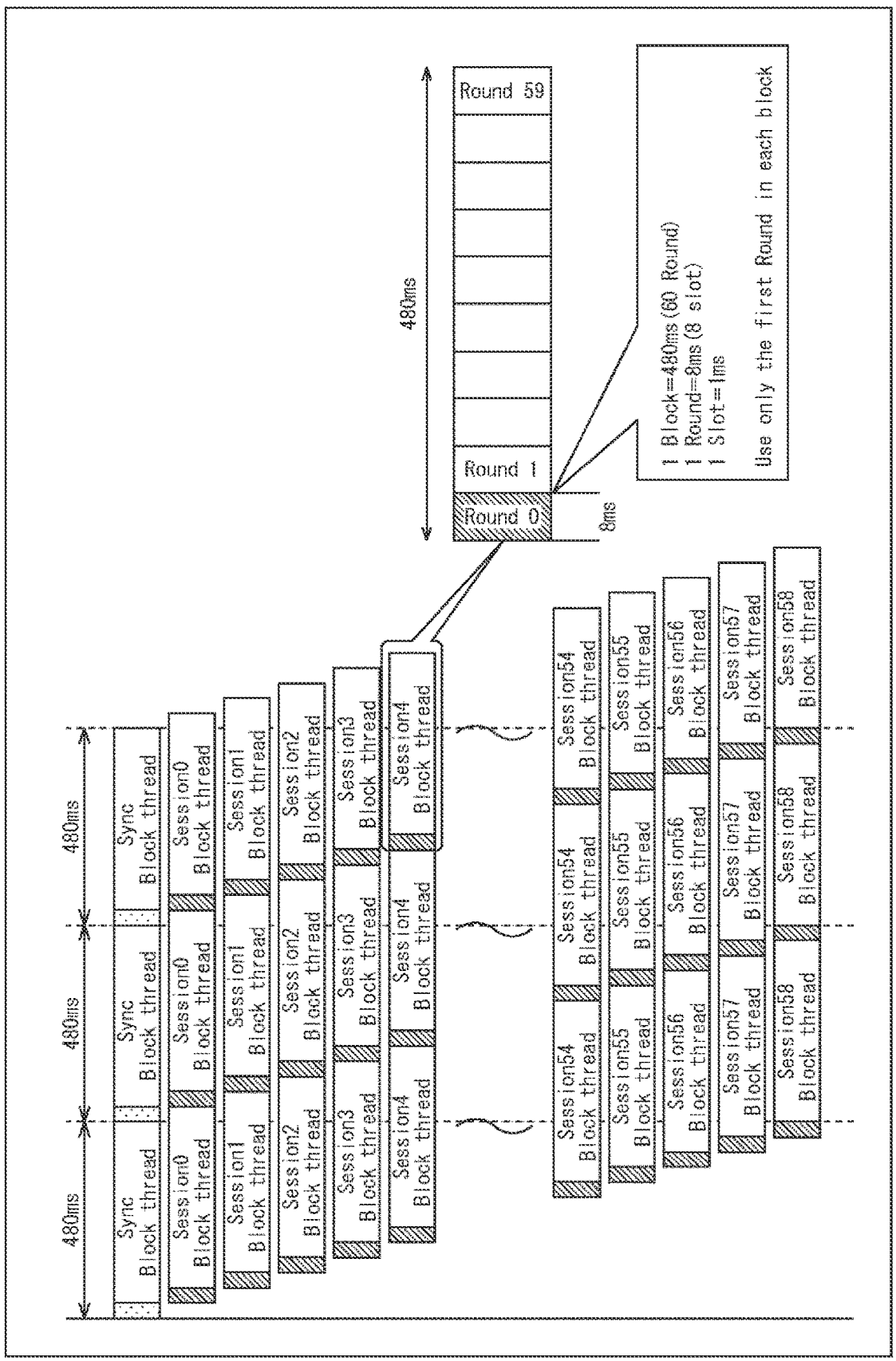
FIG. 10 is a diagram illustrating an example of time distribution in ranging using a fixed round.

FIG. 10 illustrates an example of time distribution in ranging using a fixed round.

As illustrated in FIG. 10, in any block, only the first round (Round 0) is fixedly used.

Figure 11:
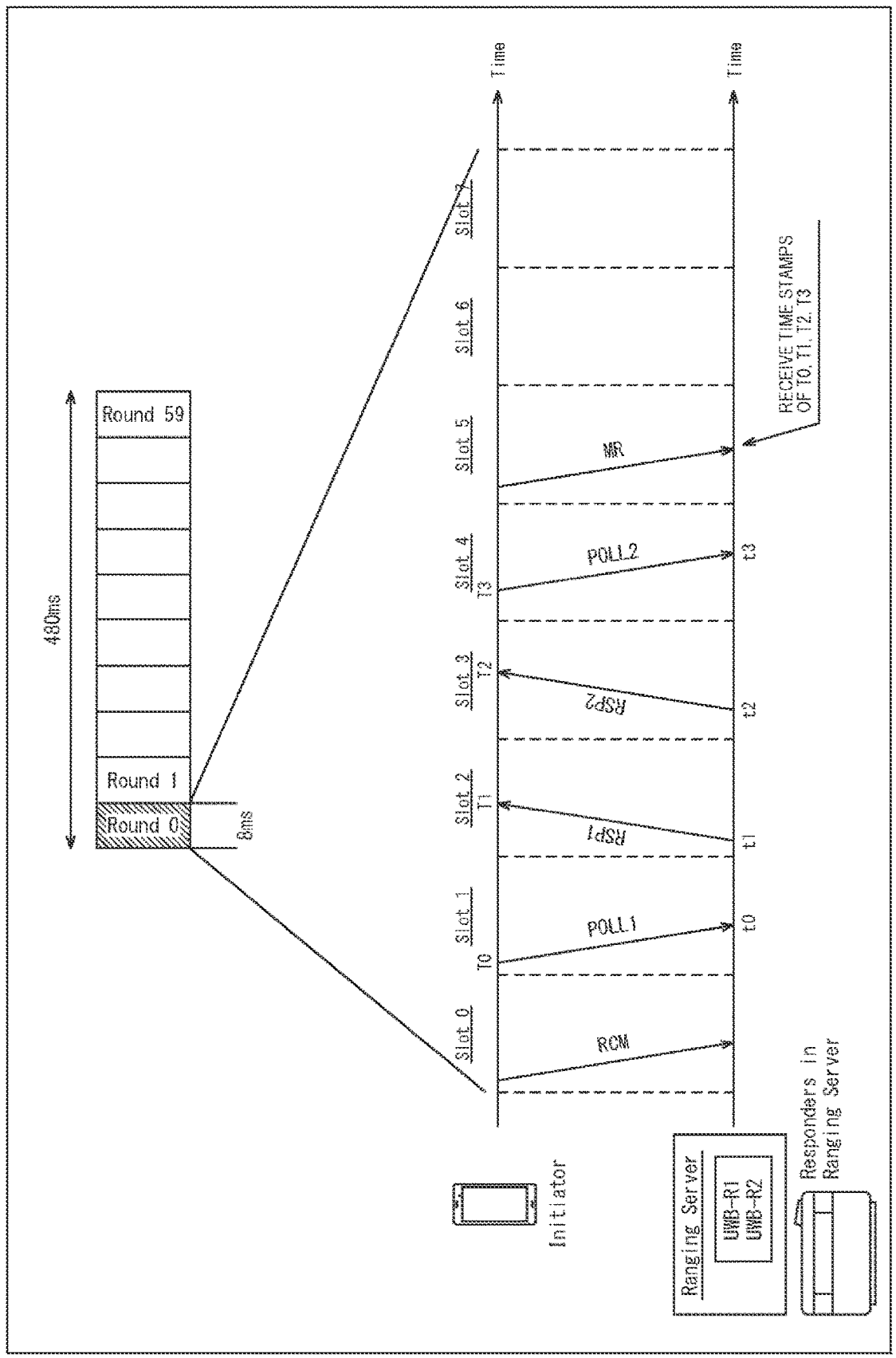
FIG. 11 is a diagram describing a ranging method.

FIG. 11 is a diagram describing a ranging method compliant with IEEEE802.15.4z.

The mobile terminal 16 operates as the initiator, transmits a ranging control message (RCM) in slot 0, and then transmits polling (POLL1) at time T0 in slot 1.

The ranging server 21 operates as the responder, the UWB responder device 42-1 transmits a response (RSP1) to polling at time t1 in slot 2, and the UWB responder device 42-2 transmits a response (RSP2) to polling at time t2 in slot 3. The response transmitted from the UWB responder device 42-1 is received at the mobile terminal 16 at time T1, and the response transmitted from the UWB responder device 42-2 is received at the mobile terminal 16 at time T2.

Thereafter, the mobile terminal 16 transmits polling (POLL2) at time t3 in slot 4, and transmits a measurement result (MR) in slot 5. Consequently, the ranging server 21 can acquire the time stamps of time T0, time T1, time T2, and time T3 and calculate ToF.

For example, when the time when the ranging server 21 receives the polling transmitted in the slot 1 is time to, ToF1 based on the response transmitted from the UWE responder device 42-1 and ToF2 based on the response transmitted from the UWB responder device 42-2 can be calculated according to the following Expression (1).

[Expression 1]

$$\begin{cases} ToF1 = ((T1-T0)-(t1-t0))/2 \\ ToF2 = ((T2-T0)-(t2-t0))/2 \end{cases} \quad (1)$$

However, since there is an error in the clocks of the UWB responder devices 42-1 and 42-2 and the mobile terminal 16, a correction is required. For example, with respect to an elapsed time from polling transmitted at time T0 of the slot 1 to polling transmitted at time t3 of the slot 4, an elapsed time (T3−T0) of the mobile terminal 16 and an elapsed time (t3−t0) of the UWE responder devices 42-1 and 42-2 are theoretically the same here, time t3 is a time at which the ranging server 21 receives polling in the slot 4.

Then, in a case where there is a difference between the clocks, when the ToF is measured with reference to the UWB responder devices 42-1 and 42-2, the elapsed time on the mobile terminal 16 side is corrected in accordance with its own scale. For example, time T0=0, time T1=20, time T3=100, time t0=0, time t1=40, and time t3=200, elapsed time (T3−T0) of the mobile terminal 16=100, and elapsed time (t3−t0) of the UWB responder devices 42-1 and 42-2=200. In this case, when the time (T1−T0) from time T0 to time T1 is adjusted to the clock on the UWB responder devices 42-1 and 42-2 side, ToF is obtained as indicated is the following Expression (2).

[Expression 2]

$$ToF=[(T1-T0)\times(t3-t0)/(T3-T0)-(t1-t0)]/2 \quad (2)$$

Here, in a configuration in which the ranging server 21 includes M UWB responder devices 42, the ToF of the nth UWB responder device 42-n can be calculated according to the following Expression (3).

[Expression 3]

$$ToF=[(Tn-T0)\times(tM+1-t0)/(TM+1-T0)-(tn-t0)]/2 \quad (3)$$

Moreover, is a configuration in which each of the plurality of UWB responder devices 42 includes a large number of antennas, the position of the mobile terminal 16 in a geometrically three-dimensional space can be uniquely specified. For example, by measuring the height in addition to measuring the distance and the azimuth of the mobile terminal 16, it is possible to further suppress the error and specify the entry of the mobile terminal 16 into the fare calculation zone 33 with high accuracy. Furthermore, by configuring each of the UWB responder devices 42-1 and 42-2 to include a plurality of antennas, two pieces of distance measurement data by ToF can be obtained, and two pieces of three-dimensional angle information by AoA can be obtained. Thus, even if any of the measurement means becomes unmeasurable, the ranging of the mobile terminal 16 can be performed by other measurement means.

Figure 12:
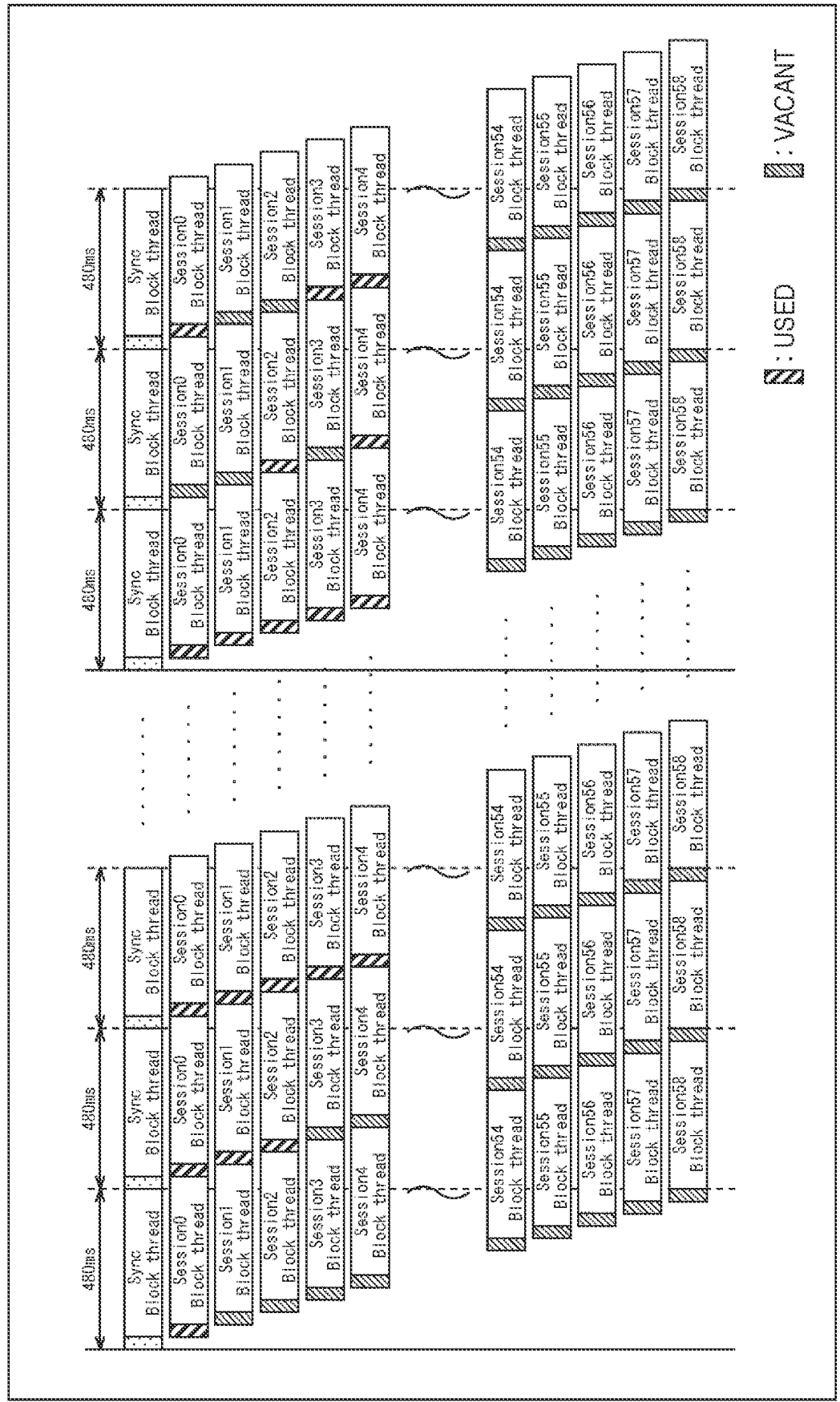
FIG. 12 is a diagram describing allocation of block threads.

FIG. 12 is a diagram describing allocation of block threads by the ranging server 21. As illustrated, the round 0 of each block thread is hatched to indicate being used or empty.

The ranging server 21 manages vacancy states of the block threads, and in response to the detected request from the mobile terminal 16, allocates the mobile terminal 16 to a predetermined available block thread and sets the same in use. Then, when notified from the UWB data communication unit 32 of the UWE gate unit 22 that the data communication processing for touchless payment is completed, the ranging server 21 releases the block thread of the mobile terminal 16 that has performed the data communication processing for touchless payment. Thereafter, the ranging server 21 can repeatedly allocate the next detected mobile terminal 16 to the vacant block thread.

For example, it is indicated that the mobile terminal 16 is allocated and in use at the timing on the right side of FIG. 12 with respect to the vacant block thread at the timing on the left side of FIG. 12. Similarly, it is indicated that the block thread in use at the timing on the left side of FIG. 12 is released and becomes an empty block thread at the timing on the right side of FIG. 12.

Figure 13:
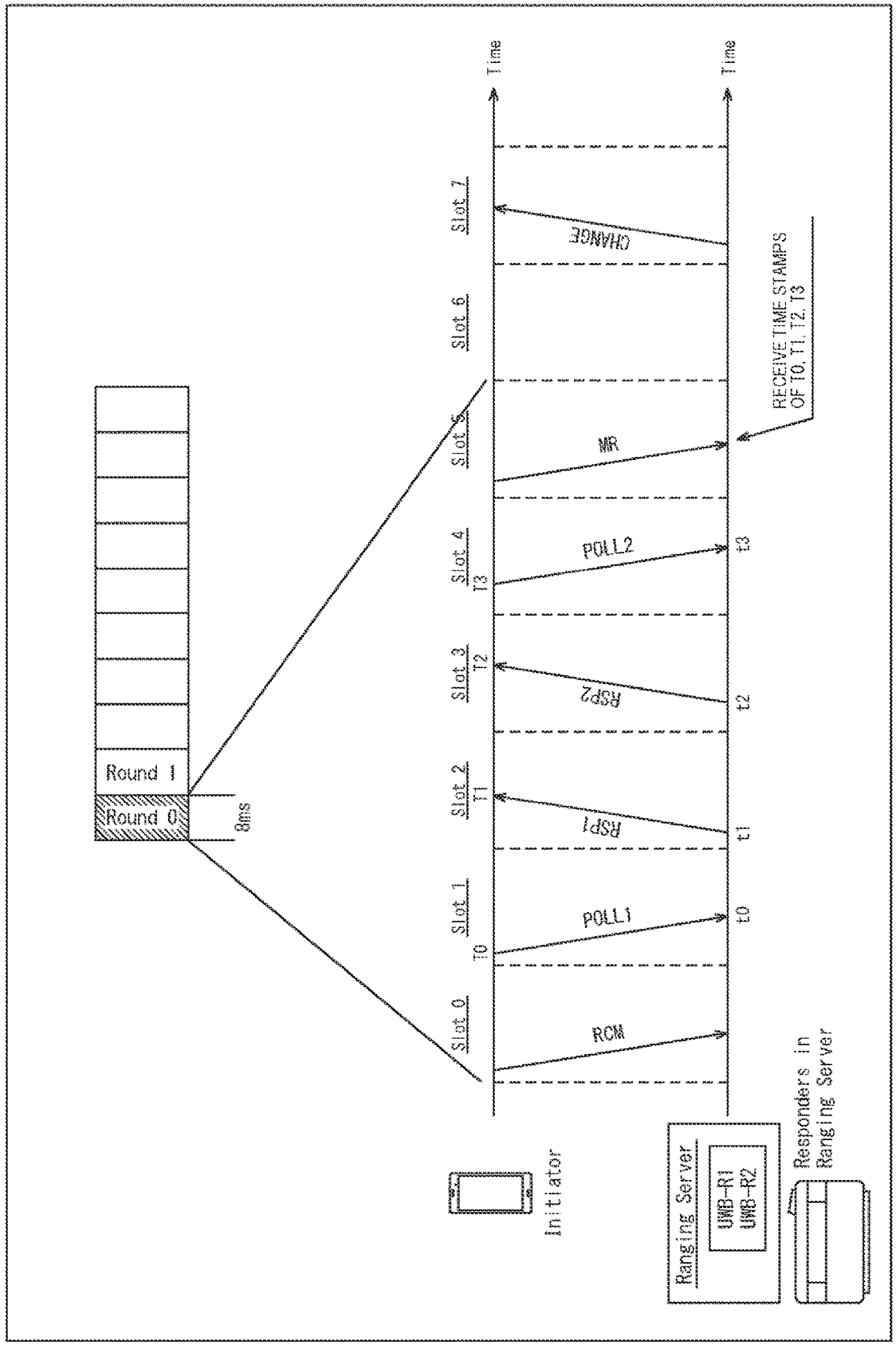
FIG. 13 is a diagram describing a data communication start signal.

FIG. 13 is a diagram describing a data communication start signal.

For example, as described with reference to FIG. 11, when the ranging server 21 detects That the mobile terminal 16 has entered the fare calculation zone 33 after the measurement result (MR) for obtaining the ToF is transmitted, a data communication start signal (CHANGE) is transmitted. Note that, in the example illustrated in FIG. 13, processing of transmitting a data communication start signal from the ranging server 21 to the mobile terminal 16 using UWB is illustrated, but communication other than UWB may be used.

Figure 4:
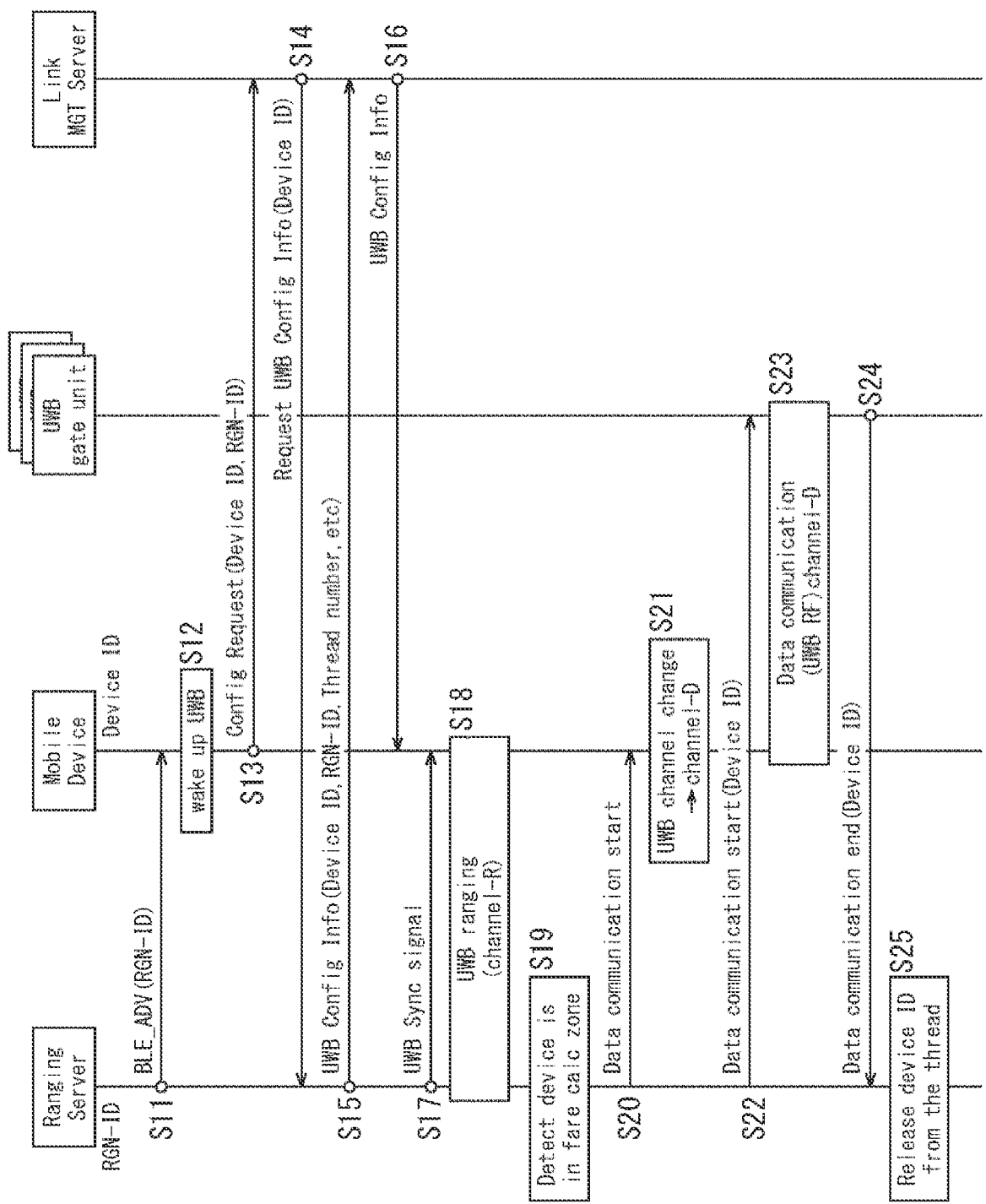
FIG. 4 is a flowchart describing a touchless fare payment processing.
Figure 14:
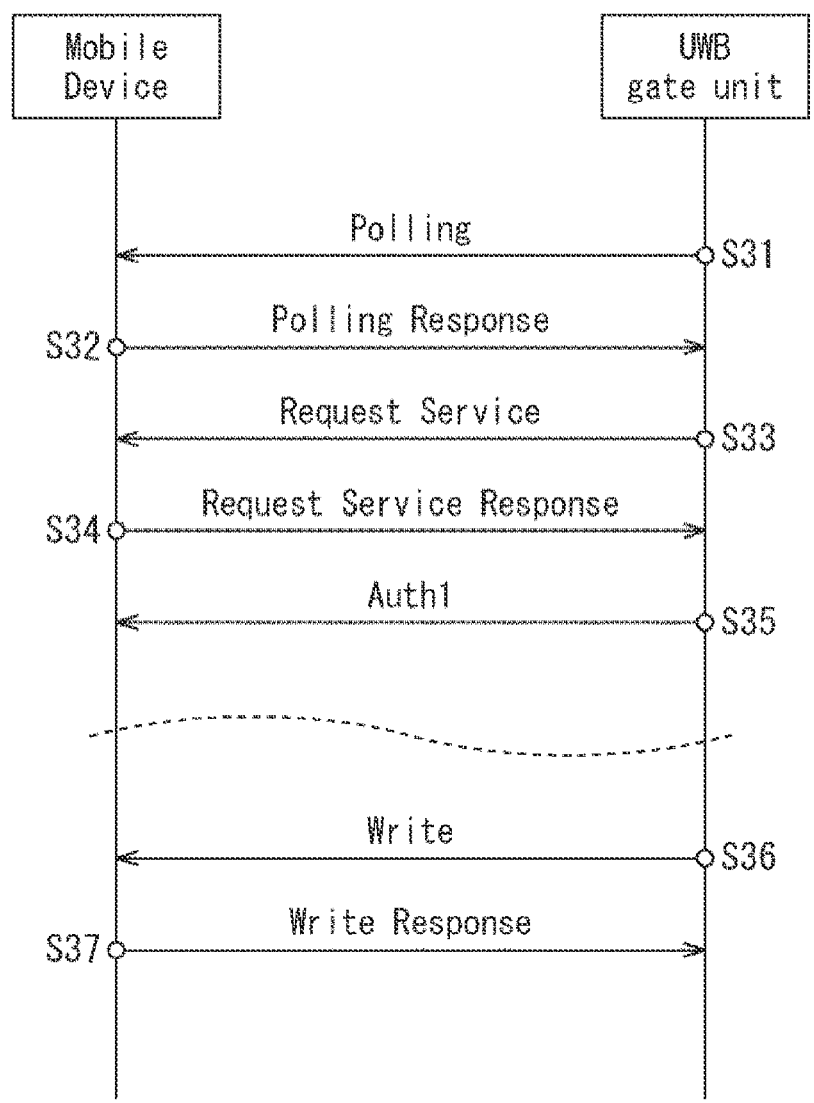
FIG. 14 is a flowchart describing data communication processing for touchless payment.

FIG. 14 is a flowchart describing the data communication processing for touchless payment performed in step S23 of FIG. 4.

As described above, when the UWB gate unit 22 receives the data communication start command in step S22, the data communication processing for touchless payment is started, and the UWB gate unit 22 transmits the polling command to the mobile terminal 16 in step S31. Then, when the mobile terminal 16 receives the polling command, the processing proceeds to step S32.

In step S32, the mobile terminal 16 transmits a response to the polling command received in step S31 to the UWB gate unit 22. Then, when the UWB gate unit 22 receives the response, the processing proceeds to step S33.

In step S33, the UWB gate unit 22 transmits a request service to the mobile terminal 16. Then, when the mobile terminal 16 receives the request service, the processing proceeds to step S34.

In step S34, the mobile terminal 16 transmits a response to the request service received in step S33 to the UWB gate unit 22. Then, when the UWB gate unit 22 receives the response, the processing proceeds to step S35.

In step S35, authentication (Auth1) for performing payment processing on the mobile terminal 16 is started, and thereafter, the UWB gate unit 22 performs the payment processing.

Then, when the payment processing is completed, the UWB gate unit 22 requests the mobile terminal 16 to perform writing in step S36, and the mobile terminal 16 transmits a response to the writing in step S37. Consequently, the data communication processing for touchless payment ends, and thereafter, the processing proceeds to step S24 in FIG. 4.

As described above, in the data communication processing for touchless payment, the UWB gate unit 22 acts as the initiator, the mobile terminal 16 acts as the responder, and the processing is performed, and communication is performed at an arbitrary timing without using a synchronization signal, a time slot, or the like.

Figure 15:
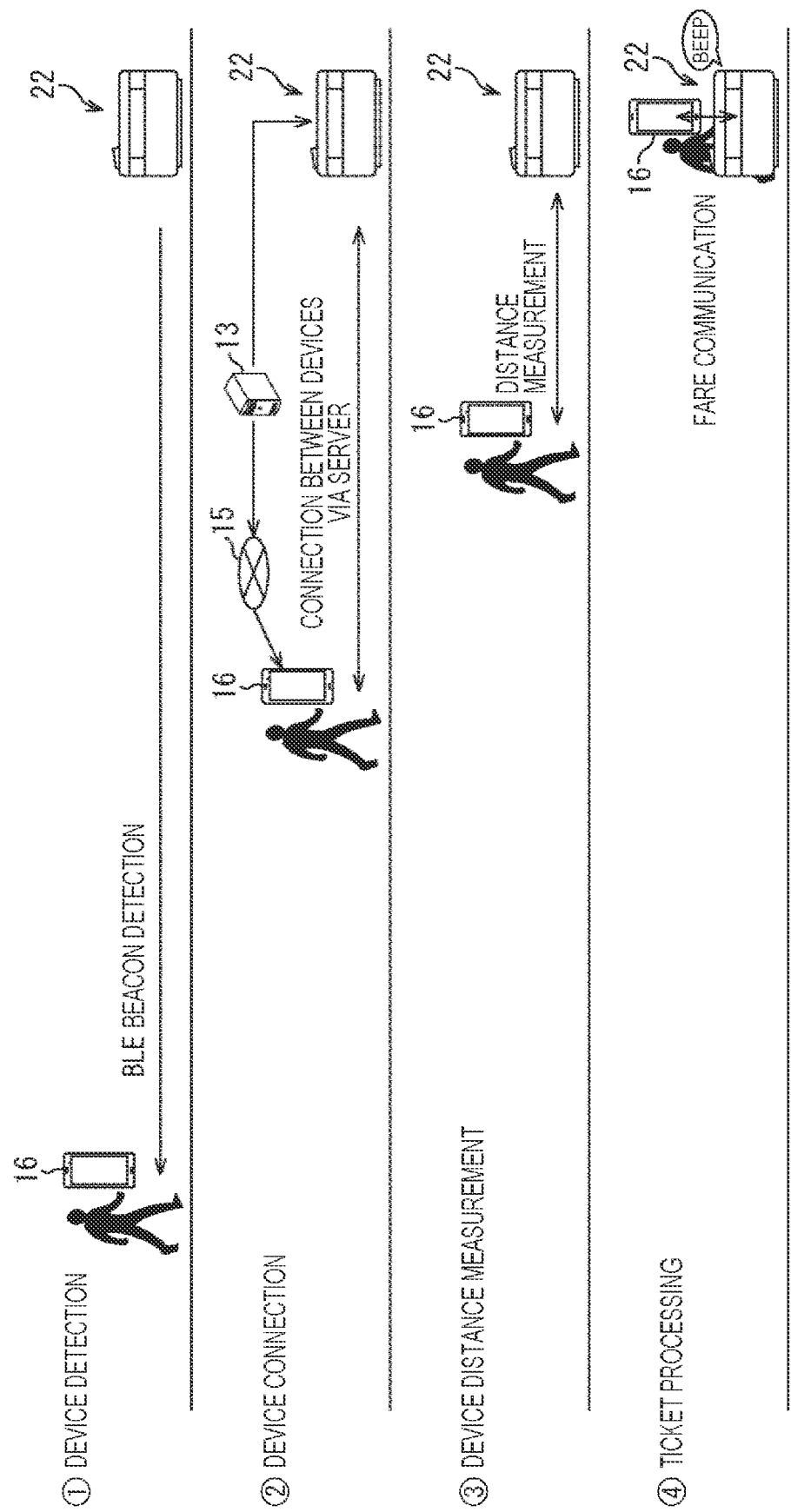
FIG. 15 is a diagram describing user experience of the touchless fare payment system.

A user experience when the user carrying the mobile terminal 16 uses the touchless fare payment system 11 will be described with reference to FIG. 15.

First, as the user approaches within a predetermined range of the UWE gate unit 22, the mobile terminal 16 detects the ELF beacon transmitted from the BLE beacon transmission device 41.

Second, while the user is moving toward the UWB gate unit 22, the mobile terminal 16 connects to the link management server 13 via the network 15, and connects to the ranging server 21 via the link management server 13.

Third, as the user approaches the UWB gate unit 22, the UWB ranging processing is performed between the mobile terminal 16 and the ranging server 21 to measure the distance from the UWB gate unit 22 to the mobile terminal 16.

Fourth, when it is detected that the user enters the fare calculation zone 33, the data communication processing for touchless payment is performed between the mobile terminal 16 and the UWB gate unit 22, and fare payment is performed in a touchless manner. At this time, a notification sound for notifying the user that the payment has been made may be output.

As described above, in the touchless fare payment system 11, the user can pay the fare only by passing through the ticket gate while holding the mobile terminal 16.

Figure 16:
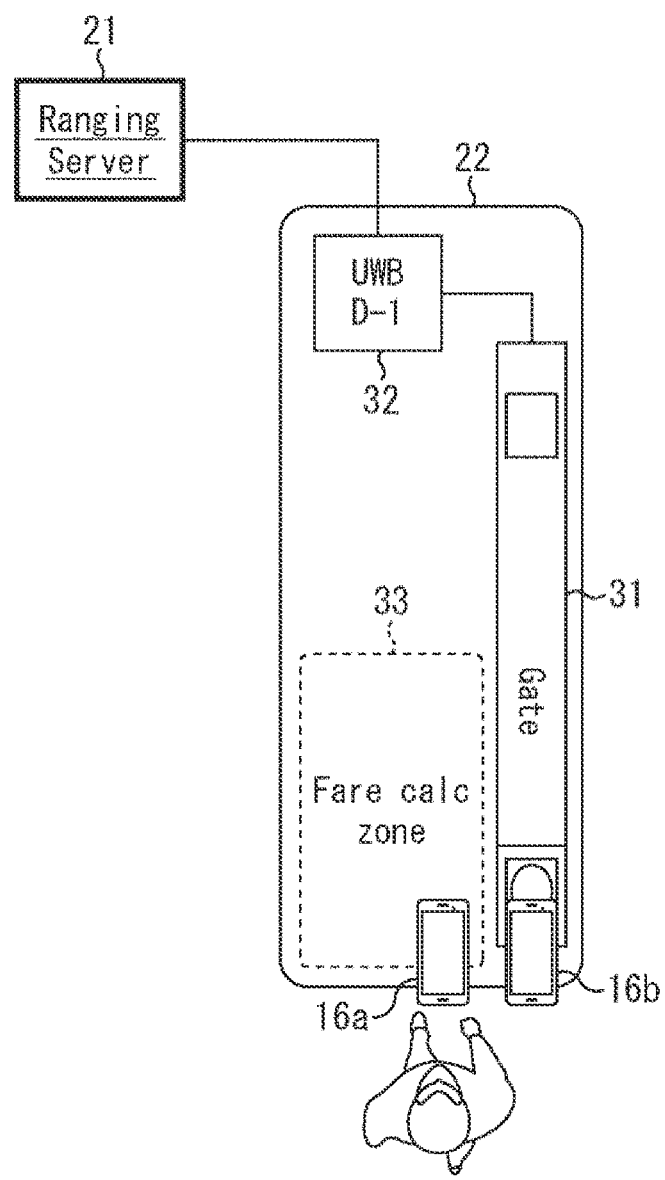
FIG. 16 is a diagram describing a coexistence method of touchless payment using UWB and touch payment using NFC.

With reference to FIG. 16, a method of coexistence of touchless payment using UWB and touch payment using NFC in the touchiest fare payment system 11 will be described.

For example, in a case where the mobile terminal 16 has both UWB and NFC functions, the touchless fare payment system 11 cannot determine in advance whether the user selects the touchless method or the touch method.

For example, if the user does not touch the NFC reader/writer of the ticket gate machine 31 as in the mobile terminal 16a when passing through the ticket gate, only touchless payment using UWB is performed.

On the other hand, in a case where the user touches the NFC reader/writer of the ticket gate machine 31 as the mobile terminal 16b, the following first to third cases are assumed to occur.

In the first case, it is assumed that NFC communication is started first, and then the mobile terminal 16 enters the fare calculation zone 33. In this case, a first pattern in which the NFC communication is completed and thereafter the mobile terminal 16 enters the fare calculation zone 33, and a second pattern in which the NFC communication is interrupted and the mobile terminal 16 enters the fare calculation zone 33 are assumed.

In the second case, it is assumed that the mobile terminal 16 enters the fare calculation zone 33, and the UWB data communication is started first. In this case, a first pattern in which the mobile terminal 16 touches the NFC reader/writer of the ticket gate machine 31 after the UWB communication is completed, and a second pattern in which the mobile terminal 16 touches the NFC reader/writer of the ticket gate machine 31 during the UWB communication are assumed.

In the third case, it is assumed that after the NFC communication is started first, the mobile terminal 16 passes through the ticket gate without entering the fare calculation zone 33.

In each of these cases, in the touchless fare payment system 11, the UWB gate unit 22 independently controls both UWB and NFC, and the exclusive control can be applied.

Corresponding to the first case, the UWB gate unit 22 completes the NFC communication if the NFC communication has been started. For the first pattern of the first case, after completing the NFC communication, the UWB gate unit 22 causes the UWE data communication unit 32 to transmit the data communication end notification (step S24 of FIG. 4) to the ranging server 21. For the second pattern of the first case, in a case where the NFC communication has not been completed, the UWB gate unit 22 determines that the user has an intention of the NFC communication, holds the data communication on the UWB side, and locks the data communication to the NFC side.

Corresponding to the second case, the UWB gate unit 22 completes the UWB communication if the UWB communication has been started. For the first pattern of the second case, the UWB gate unit 22 does not react because of the same device ID, as in the case where the same mobile terminal 16 is touched twice. With respect to the second pattern of the second case, if the UWB communication has been started, the UWB communication is completed, and the NFC communication stops the output of the carrier wave until the UWB communication is completed by exclusive control and becomes non-reactive.

In the case of the third case, since the fare payment is completed by the NFC communication, similarly to the first case, the UWB gate unit 22 causes the UWB data communication unit 32 to transmit the data communication end notification (step S24 in FIG. 4) to the ranging server 21 after completing the NFC communication.

As described above, in the touchless fare payment system 11, it as possible to easily achieve coexistence of the touchless payment using UWB and the touch payment using NFC.

As described above, the touchless fare payment system 11 uses the BLE beacon for detection of the mobile terminal 16, and uses the UWB for distance measurement and positioning of the mobile terminal 16. Thus, the touchless fare payment system 11 can achieve simultaneous connection with a large number of mobile terminals 16, for example, can be simultaneously connected with 59 mobile terminals 16 as described with reference to FIG. 7.

The touchless fare payment system 11 measures the distance and the position of the mobile terminal 16 using the UWB link in the UWB ranging processing.

Consequently, the touchless fare payment system 11 can accurately specify which mobile terminal 16 enters the fare calculation zone 33 of which UWB gate unit 22, and can reliably perform the data communication processing for touchless payment.

The touchless fare payment system 11 separates the channel (R) for ranging and the channel (D) for data communication from the channel of UWB, and switches each of the channels. Thus, the touchless fare payment system 11 can reliably perform each of the UWB ranging processing and the data communication processing for touchless payment while avoiding the interference during the communication.

In the touchless fare payment system 11, faster communication processing (6.81 Mbps or more) can be achieved by using UWB for data communication. Moreover, since the mobile terminal 16 has a configuration capable of directly accessing the eSE by the function of UWB that performs the data communication processing for touchless payment, it is possible to achieve high-speed processing as compared with a configuration in which the mobile terminal accesses the eSE from the function of BLE via the DH.

Therefore, the touchless fare payment system 11 can accurately connect the mobile terminal 16 and the UWB gate unit 22, and reliably perform touchless fare payment for paying a fare in a touchless manner.

<Touchless Fare Payment Processing for Plurality of Mobile Terminals>

Touchless fare payment processing corresponding to the use of the touchless fare payment system 11 by a user carrying a plurality of mobile terminals 16 will be described with reference to FIGS. 17 to 21.

Figure 17:
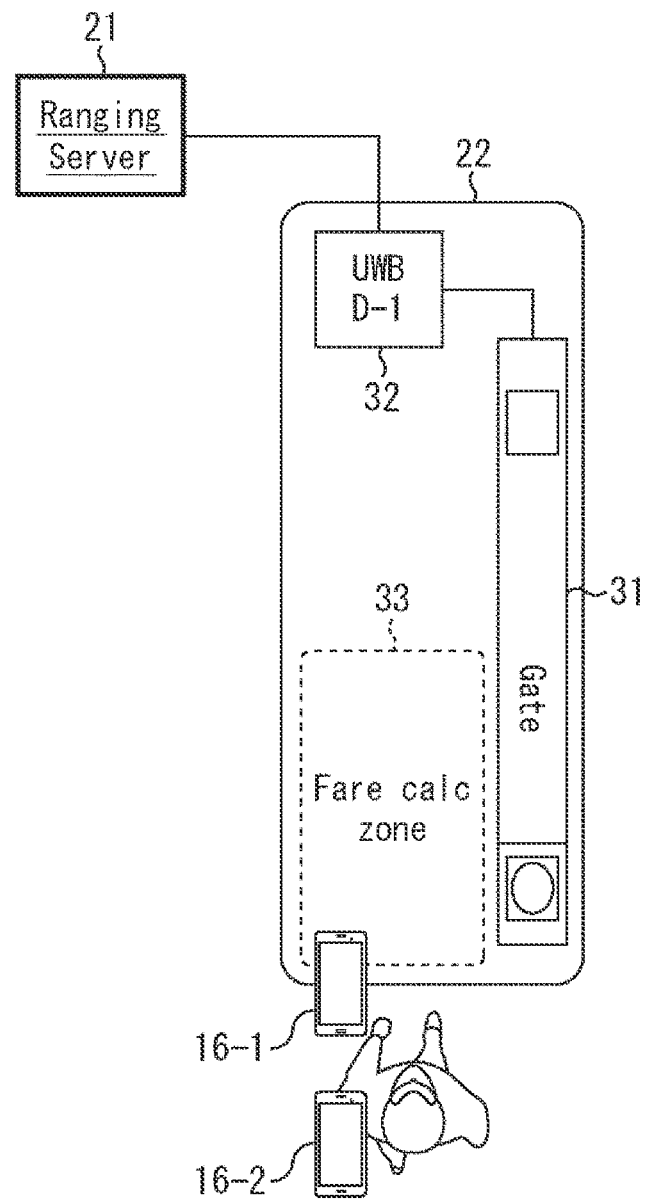
FIG. 17 is a diagram describing a case where a user carrying two mobile terminals passes through a fare calculation zone.

As illustrated in FIG. 17, a case is assumed in which a user carrying two mobile terminals 16-1 and 16-2 passes through the fare calculation zone 33. In such a case, in a case where both the mobile terminals 16-1 and 16-2 are compatible with the touchless fare payment system 11, the UWB gate unit 22 cannot determine which mobile terminal 16 should perform the touchless fare payment processing. Accordingly, it is conceivable that the UWB gate unit 22 performs the touchless fare payment processing with both the mobile terminals 16-1 and 16-2, and a means for avoiding such duplicate payment is required.

For example, in the conventional touch payment using NFC, when a user touches a ticket gate machine by overlapping two IC cards for entering/exiting a ticket gate equipped with the non-contact IC, processing of avoiding duplicate payment for the two IC cards for entering/exiting a ticket gate is performed. For example, a ticket gate machine using NFC performs detection processing of detecting whether or not there is a plurality of IC cards for entering/exiting a ticket gate in the process of a data transaction sequence depending on whether or not there is a response. Then, in a case where the plurality of IC cards for entering/exiting a ticket gate is detected, it is determined as an error, payment processing is not performed, and the user is notified that entering/exiting cannot be performed.

On the other hand, in the touchless fare payment system 11, it may not always be possible to detect that both the mobile terminals 16-1 and 16-2 exist in the fare calculation zone 33, depending on a carrying manner or a carrying position of the mobile terminals 16-1 and 16-2 by the user. For example, a situation is assumed in which the user holds the mobile terminal 16-1 by hand and puts the mobile terminal 16-2 in a backpack or a bag with casters. In such a situation, since the relative positions of the mobile terminals 16-1 and 16-2 are separated, a time difference occurs in order for the mobile terminals 16-1 and 16-2 to enter the fare calculation zone 33. Therefore, it is difficult to avoid duplicate payment only by applying detection processing similar to that when two IC cards for entering/exiting a ticket gate are overlapped and touched on the ticket gate machine.

Accordingly, as described below, the touchless fare payment processing capable of avoiding the duplicate payment is performed even if there is a time difference in the entry of the plurality of mobile terminals 16 into the fare calculation zone 33.

First, the user carrying the plurality of mobile terminals 16 executes a transport service application on the mobile terminal 16 that gives priority to performing payment processing, for example, and uses the user interface thereof to register in advance the mobile terminal 16 that does not give priority to performing payment processing. Hereinafter, the mobile terminal 16 that gives priority to performing the payment processing is referred to as a priority mobile terminal 16A, and the mobile terminal 16 that does not give priority to performing the payment processing is referred to as a non-priority mobile terminal 16B.

Figure 18:
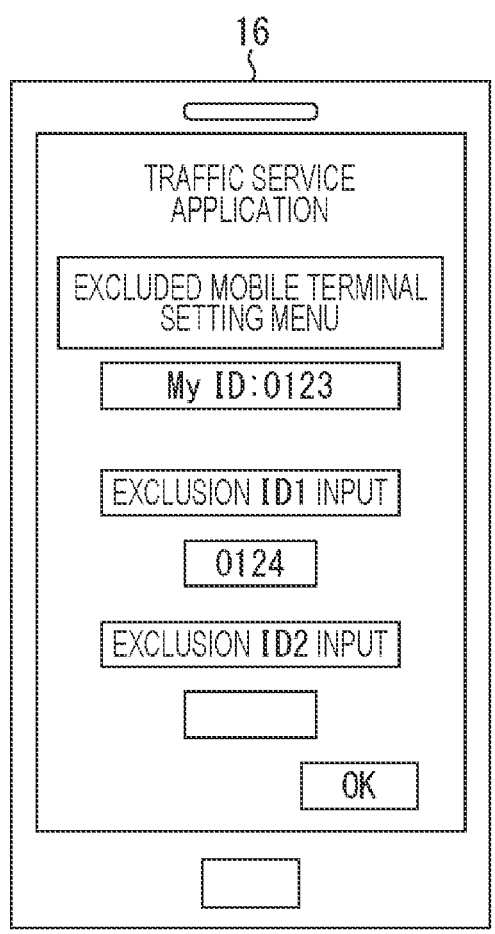
FIG. 18 is a diagram illustrating an example of an excluded mobile terminal setting menu.

FIG. 18 is a diagram illustrating an example of a user interface for registering a device ID of the non-priority mobile terminal 16B.

As illustrated in FIG. 18, in an excluded mobile terminal setting menu displayed on a screen of the priority mobile terminal 16A, the device ID of the priority mobile terminal 16A registered in advance, an input unit for inputting the device ID of the non-priority mobile terminal 16B, and the like are displayed. In the illustrated example, the device ID "My ID:0123" of the priority mobile terminal 16A is displayed. The device ID "0124" of the non-priority mobile terminal 16B input by the user is displayed in a first input unit (exclusion ID1 input) of two input units, and a second input unit (exclusion ID2 input) is not input.

The user can register the device ID of the non-priority mobile terminal 16B as the excluded device ID using the excluded mobile terminal setting menu.

For example, the excluded device ID is transmitted to the ranging server 21 via the link management server 13 together with the device ID of the priority mobile terminal 16A. Then, before transmitting the ranging setting information, the ranging server 21 can reject a connection request from the non-priority mobile terminal 16B with reference to the excluded device ID list in which the excluded device ID is registered. Thus, the data communication for payment can be avoided from being performed between the non-priority mobile terminal 16B and the UWB gate unit 22.

FIG. 19 illustrates an example of an excluded device ID list referred to by the ranging server 21.

As illustrated in FIG. 19, in the excluded device ID list, the device ID of the priority mobile terminal 16A is registered as the exclusion requesting device ID in association with the registration number (No. 1 to 59), and the excluded device ID transmitted by the priority mobile terminal 16A is registered. In the example illustrated in FIG. 19, the device ID (Device1) of the priority mobile terminal 16A and the device ID (Device2) of the non-priority mobile terminal 16B are registered in association with the registration number No. 1. Furthermore, the device ID (Device4) of the priority mobile terminal 16A and the device ID (Device5) and the device ID (Device6) of the non-priority mobile terminals 16B are registered in association with the registration number No. 2.

Hereinafter, the touchless fare payment processing capable of avoiding duplicate payment even when there is a time difference between the priority mobile terminal 16A whose device ID is Device 1 and the non-priority mobile terminal 16B whose device ID is Device 2 entering the fare calculation zone 33 will be described.

FIG. 20 is a flowchart describing processing in a case where the touchless fare payment processing is started first for the priority mobile terminal 16A.

In steps S51 and S52, similarly to steps S11 and S12 of FIG. 4, the ranging server 21 transmits the BLE beacon, and the priority mobile terminal 16A that has received the BLE beacon activates the UWB chip.

In step S53, the priority mobile terminal 16A transmits a link connection request including its own device ID (Device1), the RGN-ID of the ranging gate network 12, and the exclusion requesting device ID (Device2) to the link management server 13.

In step S54, the link management server 13 transmits the setting information request including the device ID of the priority mobile terminal 16A and the exclusion requesting device ID to the ranging server 21 of the ranging gate network 12 specified by the RGN-ID of the link connection request.

In step S55, the ranging server 21 confirms that the device ID of the priority mobile terminal 16A is not registered in the excluded device ID list (see FIG. 19) as an excluded device ID. Then, the ranging server 21 registers the device ID of the priority mobile terminal 16A as an exclusion requesting device ID in the excluded device ID list, and registers the excluded device ID transmitted by the priority mobile terminal 16A in association with the excluded device ID.

Here, the registration of the device ID in the excluded device ID list is temporary, and the registration is maintained until the touchless fare payment processing of the priority mobile terminal 16A is completed. Note that if the device ID of the priority mobile terminal 16A is registered in the excluded device ID list, the link connection request is rejected.

Thereafter, in steps S56 and S57, processing similar to that in steps S15 and S16 in FIG. 4 is performed, and hereinafter, the touchless fare payment processing with the priority mobile terminal 16A is continuously performed.

On the other hand, after there is a time lag from the start of the touchless fare payment processing for the priority mobile terminal 16A, the touchless fare payment processing is also started for the non-priority mobile terminal 16B.

In steps S61 and S62, similarly to steps S11 and S12 of FIG. 4, the ranging server 21 transmits the BLE beacon, and the non-priority mobile terminal 16B that has received the BILE beacon activates the UWB chip.

In step S63, the non-priority mobile terminal 16B transmits a link connection request including its own device ID (Device2) and the RGN-ID of the ranging gate network 12 to the link management server 13. At this time, since the excluded device ID is not registered in the non-priority mobile terminal 16B, the excluded device ID is not transmitted.

In step S64, the link management server 13 transmits the setting information request including the device ID of the non-priority mobile terminal 16B to the ranging server 21 of the ranging gate network 12 specified by the RGN-ID of the link connection request.

In step S65, the ranging server 21 confirms that the device ID of the non-priority mobile terminal 16B is registered in the excluded device ID list (see Fi 19) as the excluded device ID. That is, the priority mobile terminal 16A first starts the touchless fare payment processing, and at this point of time, the device ID of the non-priority mobile terminal 16B is already registered in the excluded device ID list as the excluded device ID in step S55 described above. Therefore, the ranging server 21 determines to reject the connection request from the non-priority mobile terminal 16B so that the data communication for payment (step S23 in FIG. 4) is not performed with the non-priority mobile terminal 16B.

In step S66, the ranging server 21 transmits the ranging setting information (notification of rejection) including an error indicating that the connection request is not allowed because the non-priority mobile terminal 16B is temporarily excluded to the link management server 13.

In step S67, the link management server 13 transmits the ranging setting information (notification of rejection) transmitted from the ranging server 21 in step S66 to the non-priority mobile terminal 16B that has transmitted the link connection request in step S63.

Consequently, the touchless fare payment processing with the non-priority mobile terminal 16B is terminated.

As described above, in the case where the touchless fare payment processing is started first for the priority mobile terminal 16A, the device ID of the non-priority mobile terminal 16B is first registered in the excluded device ID list as the excluded device ID. Consequently, while the data communication for payment is performed with the priority mobile terminal 16A, the data communication for payment is not performed with the non-priority mobile terminal 16B, and duplicate payment can be avoided.

That is, the user can pass through the UWB gate unit 22 using only the priority mobile terminal 16A without performing a special operation every time the user passes through the ticket gate. Furthermore, in the registration on the excluded device ID list, both the exclusion requesting device ID and the excluded device ID are cleared after the touchless fare payment processing of the priority mobile terminal 16A whose device ID is registered in the exclusion requesting device ID is completed.

FIG. 21 is a flowchart describing processing in a case where the touchless fare payment processing is started first for the non-priority mobile terminal 16B.

In steps S71 to S74, processing similar to that in steps S61 to S64 in FIG. 20 are performed. Then, in step S75, the ranging server 21 confirms that the device ID of the non-priority mobile terminal 16B is not registered in the excluded device ID list as an excluded device ID. That is, since the priority mobile terminal 16A has not yet started the touchless fare payment processing, the device ID of the non-priority mobile terminal 16B is not registered in the excluded device ID list as the excluded device ID at this point of time. Therefore, the ranging server 21 determines to permit the connection request with the non-priority mobile terminal 16B.

Therefore, in steps S76 and S77, processing similar no that in steps S15 and S16 in FIG. 4 is performed, and thereafter, at this time point, the touchless fare payment processing with the non-priority mobile terminal 16B is continuously performed.

On the other hand, after there is a time lag from the start of the touchless fare payment processing for the non-priority mobile terminal 16B, the touchless fare payment processing is also started for the priority mobile terminal 16A.

In steps S81 to S84, processing similar to that in steps S51 to S54 in FIG. 20 are performed. Then, in step S85, the ranging server 21 first confirms that the device ID of the priority mobile terminal 16A is not registered in the excluded device ID list as an excluded device ID. Second, the ranging server 21 registers the device ID of the priority mobile terminal 16A as the exclusion requesting device ID in the excluded device ID list, and registers the excluded device ID transmitted by the priority mobile terminal 16A in association with the excluded device ID.

Third, the ranging server 21 checks whether or not the excluded device ID registered in the excluded device ID list exists in the session of the touchless fare payment processing currently being executed. Then, in a case where the excluded device ID exists, the ranging server 21 determines to perform forced termination processing of forcibly terminating the touchless fare payment processing with the non-priority mobile terminal 16B recognized by the excluded device ID.

Thereafter, in step S86, processing similar to that in step S15 in FIG. 4 is performed, and hereinafter, the touchless fare payment processing with the priority mobile terminal 16A is continuously performed. On the other hand, the forced termination processing is performed on the touchless fare payment processing with the non-priority mobile terminal 16B, and the non-priority mobile terminal 16B is prevented from performing the data communication for payment (step S23 in FIG. 4).

As described above, in the case where the touchless fare payment processing is started for the non-priority mobile terminal 16B first, the device ID of the non-priority mobile terminal 16B is registered in the excluded device ID list later as the excluded device ID. Therefore, although the UWE ranging processing with the non-priority mobile terminal 16B is started, the device ID of the non-priority mobile terminal 16B is registered in the excluded device ID list as the excluded device ID during the UWB ranging processing. Consequently, the data communication for payment is not performed with the non-priority mobile terminal 16B (forced termination), and the data communication for payment is performed only with the priority mobile terminal 16A, so that duplicate payment can be avoided.

Note that, in a case where the user intentionally uses the non-priority mobile terminal 16B, it is necessary to perform an operation on the priority mobile terminal 16A side, such as temporarily turning off the communication function of BLE or UWB of the priority mobile terminal 16A. By performing only such an operation, the user can pass through the UWB gate unit 22 using the non-priority mobile terminal 16B.

Configuration Example of Computer

Next, the series of processes (information processing method) described above can be performed by hardware or can be performed by software. In a case where the series of processes is performed by software, a program constituting the software is installed in a general-purpose computer or the like.

Figure 22:
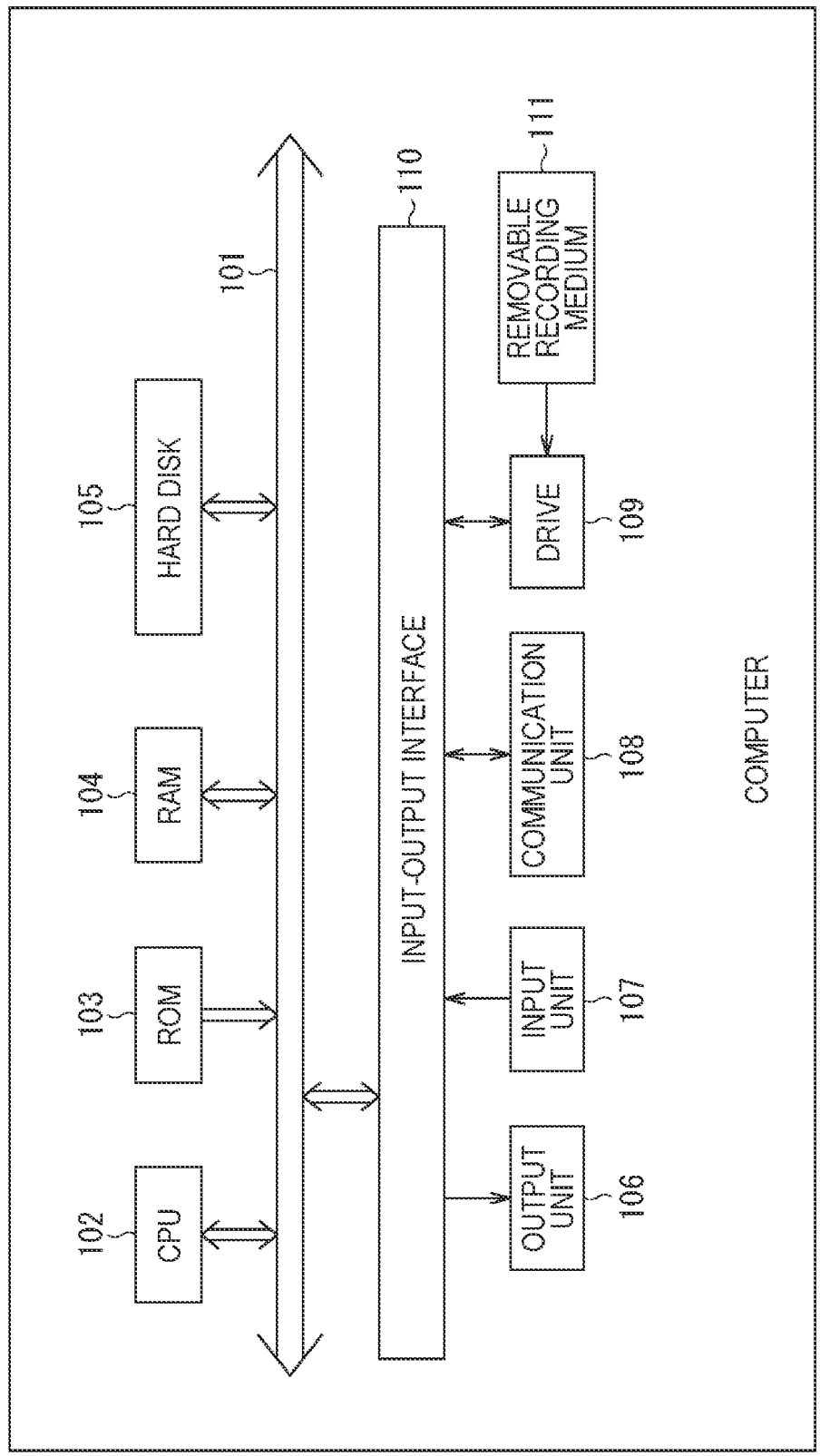
FIG. 22 is a block diagram illustrating a configuration example of an embodiment of a computer to which the present technology is applied.

FIG. 22 is a block diagram illustrating a configuration example of an embodiment of a computer in which a program for executing the above-described series of processing is installed.

The program can be pre-recorded on a hard disk 105 or ROM 103 as a recording medium incorporated in the computer.

Alternatively, the program can be stored (recorded) in a removable recording, medium 111 driven by a drive 109. Such a removable recording medium 111 can be provided as what is called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that in addition to installing the program on the computer from the removable recording medium 111 as described above, the program can be downloaded to the computer via a communication network or a broadcasting network and installed on the incorporated hard disk 105. That is, for example, the program can be transferred to the computer wirelessly from a download site via an artificial satellite for digital satellite broadcasting, or transferred to the computer by wire via a network such as a local area network (LAN) or the Internet.

The computer has an incorporated central processing unit (CPU) 102, and an input-output interface 110 is connected to the CPU 102 via a bus 101.

If a command is input by a user through the input-output interface 110 by operating an input unit 107 or the like, the CPU 102 executes the program stored in the read only memory (ROM) 103 accordingly. Alternatively, the CPU 102 loads the program stored in the hard disk 105 into a random access memory (PAM) 104 and executes the program.

Thus, the CPU 102 performs the processing according to the above-described flowchart or the processing performed according to the above-described configuration of the block diagram. Then, the CPU 102 outputs a processing result thereof from an output unit 106 or sends the processing result from a communication unit 108 if necessary via the input-output interface 110 for example, and further causes recording of the processing result on the hard disk 105, or the like.

Note that the input unit 107 includes a keyboard, a mouse, a microphone, and the like. Furthermore, the output unit 106 includes a liquid crystal display (LCD), a speaker, and the like.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Further, for example, a configuration described as one device (or processing section) may be divided and configured as a plurality of devices (or processing sections). Conversely, configurations described above as a plurality of devices (or processing sections) may be combined and configured as one device (or processing section). Furthermore, a configuration other than those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the present technology can take a cloud computing configuration in which one function is processed in a shared and collaborative manner by a plurality of devices via a network.

Furthermore, for example, the above-described program can be executed by an arbitrary device. In that case, it is sufficient if the device has necessary functions (functional blocks and the like) and can acquire necessary information.

Furthermore, for example, respective steps described in the above-described flowcharts can be executed by one device or can be executed in a shared manner by a plurality of devices. Moreover, in a case where a plurality of processes is included in one step, the plurality of processes included in the one step can be executed in a shared manner by a plurality of devices in addition to being executed by one device. In other words, a plurality of processes included in one step can be executed as processes of a plurality of steps. Conversely, a process described as a plurality of steps can be collectively executed as one step.

Note that the program executed by the computer may be configured so that the processes in the steps for describing the program are executed in chronological order according to the order described in the present description, or may be executed in parallel or individually at a necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Note that the plurality of present technologies which has been described in the present description can each be implemented independently as a single unit as long as no contradiction occurs. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above Example of Combinations of Configurations Note that the present technology can have configurations as follows.

(1)
An information processing device, including:
a beacon transmission unit that transmits, by using first wireless communication that is a communication standard capable of performing communication in a wider range than a predetermined short distance, a beacon that is a signal for detecting a mobile terminal within a communication range of the first wireless communication; and
a ranging processing unit that performs, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, in which
when it is detected that the mobile terminal enters the payment area on the basis of a result of ranging processing using the second wireless communication, data communication for payment using the second wireless communication is performed between the payment unit and the mobile termnal.

(2)
The information processing device according to (1) above, in which
the beacon includes a unique payment network identification (ID) allocated to each payment network to which a plurality of the payment units arranged within a ranging range in which the ranging processing is performed with the mobile terminal is connected.

(3)
The information processing device according to (1) or (2) above, in which
when the beacon transmitted from the beacon transmission unit is received by the mobile terminal, a communication chip for performing the second wireless communication in the mobile terminal is activated.

(4)
The information processing device according to any one of (1) to (3) above, in which
communication for exchanging information necessary for ranging processing performed between the ranging processing unit and the mobile terminal is performed via a management server that manages connection between the payment unit and the mobile terminal.

(5)
The information processing device according to any one of (1) to (4) above, in which
when the ranging processing is performed with a plurality of the mobile terminals, the ranging processing unit repeatedly performs transmission of a block thread for each session in which a plurality of blocks is consecutive by time distribution in which time of one round among a plurality of rounds constituting each block is shifted.

(6)
The information processing device according to (5) above, in which
the ranging processing unit transmits a synchronization signal for performing synchronization with the mobile terminal in the first round of the block thread transmitted at a first timing among a plurality of the block threads repeatedly transmitted.

(7)
The information processing device according to (6) above, in which
when the mobile terminal is detected, the mobile terminal is allocated to the block thread that is empty among the plurality of the block threads and set in use, and
when the data communication for payment with the mobile terminal ends, the block thread in use is released.

(8)
The information processing device according to any one of (1) to (7) above, in which
in the ranging process, the mobile terminal acts as an initiator and the ranging processing unit acts as a responder, or the ranging processing unit acts as an initiator and the mobile terminal acts as a responder.

(9)
The information processing device according to any one of (1) to (8) above, in which
when a start signal for starting the data communication for payment is transmitted by the mobile terminal, switching from a first channel of the second wireless communication used in the ranging processing to a second channel of the second wireless communication different from the first channel is performed in the mobile terminal, and the data communication for payment is performed between the mobile terminal and the payment unit by using the second channel of the second wireless communication.

(10)

The information processing device according to (9) above, in which
in the data communication for payment, the payment unit acts as an initiator, and the mobile terminal acts as a responder to perform communication.

(11)

The information processing device according to (9) or (10) above, in which
in the data communication for payment, communication is performed at an arbitrary timing for each of the payment unit and the mobile terminal.

(12)

The information processing device according to any one of (1) to (11) above, in which
when notification of a device ID of a non-priority mobile terminal that is the mobile terminal set by a user so as not to give priority to performing the payment processing is provided from a priority mobile terminal that is the mobile terminal set by the user so as to give priority to performing the payment processing, the device ID of the non-priority mobile terminal is registered at least in an exclusion list, and a connection request from the non-priority mobile terminal is rejected with reference to the exclusion list.

(13)

An information processing method including, by an information processing device:
transmitting, by using first wireless communication that is a communication standard capable of performing communication in a wider range than a predetermined short distance, a beacon that is a signal for detecting a mobile terminal within a communication range of the first wireless communication; and
performing, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, in which
when it is detected that the mobile terminal enters the payment area on the basis of a result of ranging processing using the second wireless communication, data communication for payment using the second wireless communication is performed between the payment unit and the mobile terminal.

(14)

A mobile terminal that
receives, by using first wireless communication that is a communication standard capable of performing communication in a wider range than a predetermined short distance, a beacon that is a signal transmitted from an information processing device and is for detecting a mobile terminal within a communication range of the first wireless communication, and
performs, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, in which
in response to detection of entering the payment area on the basis of a result of ranging processing using the second wireless communication, data communication for payment using the second wireless communication is performed with the payment unit.

(15)

The mobile terminal according to (14) above, in which
in a case of being set by the user so as to give priority to performing the payment processing, the information processing device is notified of a device TD of a non-priority mobile terminal that is another of the mobile terminals and set by the user so as not to give priority to performing the payment processing, causing at least the device ID of the non-priority mobile terminal to be registered in an exclusion list, and
the information processing device is caused to refer to the exclusion list, and rejects a connection request from the non-priority mobile terminal.

(16)

An information processing method including, by a mobile terminal:
receiving, by using first wireless communication that is a communication standard capable of performing communication in a wider range than a predetermined short distance, a beacon that is a signal transmitted from an information processing device and is for detecting a mobile terminal within a communication range of the first wireless communication, and
performing, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, in which
in response to detection of entering the payment area on the basis of a result of ranging processing using the second wireless communication, data communication for payment using the second wireless communication is performed with the payment unit.

Note that the present embodiments are not limited to the above-described embodiments, and various modifications are possible without departing from the gist of the present disclosure. Furthermore, the effects described in the present description are merely examples and are not limited, and other effects may be provided.

REFERENCE SIGNS LIST

11 Touchless fare payment system
12 Ranging gate network
13 Link management server
14 and 15 Network
16 Mobile terminal
21 Ranging server
22 UWB gate unit
31 Ticket gate machine
32 UWB data communication unit
33 Fare calculation zone
41 BLE beacon transmission device
42 UWB responder device

The invention claimed is:

1. An information processing device, comprising:
a beacon transmission unit that transmits, by using first wireless communication that is a communication standard capable of performing communication in a wider range than a predetermined short distance, a beacon that is a signal for detecting a mobile terminal within a communication range of the first wireless communication; and
a ranging processing unit that performs, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, wherein
when it is detected that the mobile terminal enters the payment area on a basis of a result of ranging processing using the second wireless communication, data communication for payment using the second wireless communication is performed between the payment unit and the mobile terminal.

2. The information processing device according to claim 1, wherein
the beacon includes a unique payment network identification (ID) allocated to each payment network to which a plurality of the payment units arranged within a ranging range in which the ranging processing is performed with the mobile terminal is connected.

3. The information processing device according to claim 1, wherein
when the beacon transmitted from the beacon transmission unit is received by the mobile terminal, a communication chip for performing the second wireless communication in the mobile terminal is activated.

4. The information processing device according to claim 1, wherein
communication for exchanging information necessary for ranging processing performed between the ranging processing unit and the mobile terminal is performed via a management server that manages connection between the payment unit and the mobile terminal.

5. The information processing device according to claim 1, wherein
when the ranging processing is performed with a plurality of the mobile terminals, the ranging processing unit repeatedly performs transmission of a block thread for each session in which a plurality of blocks is consecutive by time distribution in which time of one round among a plurality of rounds constituting each block is shifted.

6. The information processing device according to claim 5, wherein
the ranging processing unit transmits a synchronization signal for performing synchronization with the mobile terminal in the first round of the block thread transmitted at a first timing among a plurality of the block threads repeatedly transmitted.

7. The information processing device according to claim 6, wherein
when the mobile terminal is detected, the mobile terminal is allocated to the block thread that is empty among the plurality of the block threads and set is use, and when the data communication for payment with the mobile terminal ends, the block thread in use is released.

8. The information processing device according to claim 1, wherein
in the ranging process, the mobile terminal acts as an initiator and the ranging processing unit acts as a responder, or the ranging processing unit acts as an initiator and the mobile terminal acts as a responder.

9. The information processing device according to claim 1, wherein
when a start signal for starting the data communication for payment is transmitted by the mobile terminal, switching from a first channel of the second wireless communication used is the ranging processing to a second channel of the second wireless communication different from the first channel is performed in the mobile terminal, and
the data communication for payment is performed between the mobile terminal and the payment unit by using the second channel of the second wireless communication.

10. The information processing device according to claim 9, wherein
in the data communication for payment, the payment unit acts as an initiator, and the mobile terminal acts as a responder to perform communication.

11. The information processing device according to claim 9, wherein
in the data communication for payment, communication is performed at an arbitrary timing for each of the payment unit and the mobile terminal.

12. The information processing device according to claim 1, wherein
when notification of a device ID of a non-priority mobile terminal that is the mobile terminal set by a user so as not to give priority to performing the payment processing is provided from a priority mobile terminal that is the mobile terminal set by the user so as to give priority to performing the payment processing, the device ID of the non-priority mobile terminal is registered at least in an exclusion list, and a connection request from the non-priority mobile terminal is rejected with reference to the exclusion list.

13. An information processing method comprising, by an information processing device:
transmitting, by using first wireless communication that is a communication standard capable of performing communication in a wider range than a predetermined short distance, a beacon that is a signal for detecting a mobile terminal within a communication range of the first wireless communication; and
performing, by using second wireless communication that is a communication standard different from the first wireless communication and is capable of performing communication in a wider range than the predetermined short distance, ranging processing of measuring at least a distance from the mobile terminal detected using the beacon to a payment unit provided with a payment area in which predetermined payment processing is performed with the mobile terminal, wherein
when it is detected that the mobile terminal enters the payment area on a basis of a result of ranging processing using the second wireless communication, data communication for payment using the second wireless communication is performed between the payment unit and the mobile terminal.

14. A mobile terminal that
receives, by using first wireless communication that is a communication standard capable of performing communication in a wider range than a predetermined short distance, a beacon that is a signal transmitted from an information processing device and is for detecting a mobile terminal within a communication range of the first wireless communication, and
performs, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, wherein
in response to detection of entering the payment area on a basis of a result of ranging processing using the second wireless communication, data communication for payment using the second wireless communication is performed with the payment unit.

15. The mobile terminal according to claim 14, wherein
in a case of being set by the user so as to give priority to performing the payment processing, the information processing device is notified of a device ID of a non-priority mobile terminal that is another of the mobile terminals and set by the user so as not to give priority to performing the payment processing, causing at least the device ID of the non-priority mobile terminal to be registered in an exclusion list, and
the information processing device is caused to refer to the exclusion list, and rejects a connection request from the non-priority mobile terminal.

16. An information processing method comprising, by a mobile terminal:
receiving, by using first wireless communication that is a communication standard capable of performing communication in a wider range than a predetermined short distance, a beacon that is a signal transmitted from an information processing device and is for detecting a mobile terminal within a communication range of the first wireless communication, and
performing, by using second wireless communication that is a communication standard different from the first wireless communication and is capable of performing communication in a wider range than the predetermined short distance, ranging processing of measuring at least a distance to a payment unit provided with a payment area in which predetermined payment processing is performed, wherein
in response to detection of entering the payment area on a basis of a result of ranging processing using the second wireless communication, data communication for payment using the second wireless communication is performed with the payment unit.

* * * * *